US008260803B2

(12) United States Patent
Hsu et al.

(10) Patent No.: US 8,260,803 B2
(45) Date of Patent: Sep. 4, 2012

(54) SYSTEM AND METHOD FOR DATA STREAM PROCESSING

(75) Inventors: Meichun Hsu, Cupertino, CA (US); Qiming Chen, Los Altos Hill, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 52 days.

(21) Appl. No.: 12/907,948

(22) Filed: Oct. 19, 2010

(65) Prior Publication Data

US 2012/0078951 A1 Mar. 29, 2012

Related U.S. Application Data

(63) Continuation-in-part of application No. 12/888,427, filed on Sep. 23, 2010.

(51) Int. Cl.
*G06F 17/30* (2006.01)
(52) U.S. Cl. ........................................................ 707/769
(58) Field of Classification Search .............. 707/4, 769; 709/231; 717/115; 710/12
See application file for complete search history.

(56) References Cited

U.S. PATENT DOCUMENTS

| 6,317,738 | B1 * | 11/2001 | Lohman et al. ................. 1/1 |
| 7,403,959 | B2 | 7/2008 | Nishizawa et al. |
| 7,991,682 | B1 * | 8/2011 | Birnbaum et al. .............. 705/37 |
| 2008/0120283 | A1 * | 5/2008 | Liu et al. ............................ 707/4 |
| 2009/0055370 | A1 * | 2/2009 | Dagum et al. ..................... 707/4 |
| 2009/0106214 | A1 | 4/2009 | Jain et al. |
| 2009/0271529 | A1 | 10/2009 | Kashiyama et al. |
| 2009/0287628 | A1 | 11/2009 | Indeck et al. |
| 2010/0106853 | A1 * | 4/2010 | Kashiyama et al. ........... 709/231 |
| 2010/0175049 | A1 * | 7/2010 | Ramsey et al. ................ 717/115 |
| 2010/0250572 | A1 | 9/2010 | Chen et al. |
| 2010/0293301 | A1 * | 11/2010 | Amini et al. ..................... 710/12 |
| 2011/0066894 | A1 * | 3/2011 | Berlyant et al. .............. 714/38.1 |

OTHER PUBLICATIONS

Qiming Chen et al., "Experience in Extending Query Engine for Continuous Analytics," Tech Rep HP Laboratories—2010-44, May 21, 2010 (available as of Oct. 18, 2010 at http://www.hpl.hp.com/techreports/2010/HPL-2010-44.pdf).

Meichun Hsu et al., "Generalized UDF for Analytics Inside Database Engine," LNCS (Lecture Notes in Computer Science) vol. 6184, pp. 742-754, from WAIM (Web-Age Information Management) 2010 Conference proceedings Jul. 15-17, 2010 (Support for Jul. 15-17, 2010 date at Document MM).

Qiming Chen et al. "Efficiently Support MapReduce-like Computation Models Inside Parallel DBMS," Proc. Thirteenth International Database Engineering & Applications Symposium (IDEAS'09), Sep. 16-18, 2009.

Qiming Chen et al., "Extend UDF Technology for Integrated Analytics", Proc., LNCS vol. 5691, pp. 256-270, from DaWak Conference proceedings, Aug. 31-Sep. 2, 2009 (Support for Aug. 31-Sep. 2, 2009 date at Document NN).

(Continued)

*Primary Examiner* — Etienne Leroux

(57) ABSTRACT

A method and system for processing a data stream are described. The method executes, until the occurrence of a cut condition, a map function from a set of query processing steps to generate map results for a first portion of the data stream, executes a reduce function from the set of query processing steps to generate history-sensitive data from the map results, and rewinds the set of query processing steps, without termination of processing. The history-sensitive data is maintained for a second execution of the map function and reduce function on a second portion of the data stream.

25 Claims, 12 Drawing Sheets

OTHER PUBLICATIONS

Qiming Chen et al., "Data-Continuous SQL Process Model," LNCS vol. 5331, pp. 175-192, from OTM 2008 Conferences proceedings (Part I), Nov. 9-14, 2008 (Support for Nov. 9-14, 2008 date at Document OO).

Arvind Arasu et al., "Stream : The Stanford Data Stream Management System," Department of Computer Science, Stanford University, 2004 (available as of Oct. 18, 2010 at http://ilpubs.stanford.edu:8090/641/1/2004-20.pdf).

Tasso Argyros, "How Aster In-Database MapReduce Takes UDF's to the Next Level," Aug. 27, 2008, (available as of Aug. 30, 2010 at www.asterdata.com/blog/index.php/2008/08/27/how-asters-in-database-mapreduce-takes-udfs-to-the-next-level/).

Ron Avnur et al., "Eddies: Continuously Adaptive Query Processing," University of California, Berkeley, 2000 (available as of Oct. 18, 2010 at http://db.cs.berkeley.edu/papers/sipmod00-eddy.pdf).

Neil Conway, "An Introduction to Data Stream Query Processing," Truviso, Inc., May 24, 2007. (available as of Oct. 18, 2010 at http://neilconway.org/talks/stream_intro.pdf).

Seth Grimes, "In-Database Analytics: A Passing Lane for Complex Analysis," Intelligent Enterprise, Dec. 2008 (available as of Oct. 18, 2010 at http://intelligent-enterprise.informationweek.com/showArticle.jhtml;jsessionid=4PCQYI12DP2JPQE1GHPCKH4ATMY32JVN?articleID=212500351).

Nikos Koudas et al., "Data Stream Query Processing," University of Toronto and AT&T Labs-Research, Sep. 4, 2005 (available as of Oct. 18, 2010 at http://queens.db.toronto.edu/~koudas/docs/stream-final.pdf).

Hewlett-Packard Company, "Neoview Owner's Manual," (HP Part No. 541592-005), Mar. 2007.

Naresh Rapolu et al., "Transactional Support in MapReduce for Speculative Parallelism," Department of Computer Science, Purdue University, Mar. 2010 (available as of Oct. 18, 2010 at http://www.cs.purdue.edu/research/technical_reports/2010/TR%02010-001.pdf).

Sys-Con Media Inc., "Java Feature—Building Real-Time Applications with Continuous Query Technology," Aug. 28, 2006 (available as of Dec. 20, 2010 at http://java.sys-con.com/node/260054/ and http://java.sys-con.com/node/260054?page0,1).

Brandyn White et al., "Web-Scale Computer Vision using MapReduce for Multimedia Data Mining," ACM MDMKDD'10, Jul. 25, 2010, Washington, DC.

Andrew Witkowski et al., "Continuous Queries in Oracle," ACM VLBD 2007, Sep. 23-28, 2007, Vienna, Austria.

Damian Black, "Relational Asynchronous Messaging: A New Paradigm for Data Management & Integration," Jan. 2007.

SQL Stream, Product Page (SQL Stream RAMMS) as of Jun. 13, 2008, SQL Stream Incorporated (available as of Dec. 20, 2010 at https://web.archive.org/web/2008061332512/www.sqlstream.com/products/productoffersRAMMS.htm).

Hewlett-Packard Company, "HP Neoview Enterprise Data Warehousing Platform," Apr. 1, 2007 (available as of Oct. 18, 2010 at http://www.hp.com/hpinfo/newsroom/press_kits/2007/businesstechnoloqy/brochure_neoview4AA0-7932enw.pdf?jumpid=reg_R1002_USEN).

Arvind Arasu et al., "The CQL Continuous Query Language: Semantic Foundations and Query Execution," VLDB Journal 15(2), pp. 121-142, 2006 (Published on-line Jul. 22, 2005).

Sirish Chandrasekaran et al., "TelegraphCQ: Continuous Dataflow Processing for an Uncertain World," CIDR Conf. 2003.

J. Dean, "Experiences with MapReduce, an Abstraction for Large-Scale Computation," Powerpoint Presentation, 2006 (available as of Oct. 18, 2010 at http://www.cs.virginia.edu/~pact2006/program/mapreduce-pact06-keynote.pdf).

J. Dean, "Experiences with MapReduce, an Abstraction for Large-Scale Computation," International Conf on Parallel Architecture and Compilation Techniques. ACM PACT 2006 (Abstract), Seattle, Washington (Sep. 16-20, 2006).

D.J. DeWitt et al., "Clustera: An Integrated Computation and Data Management System," ACM PVLDB '08, Aug. 23-28, 2008, Auckland, New Zealand.

Usama M. Fayyad et al., "Multi-Interval Discretization of Continuous-Valued Attributes for Classification Learning," Sep. 1, 1993, Chambery, France (available as of Oct. 18, 2010 at http://trs-new.jpl.nasa.gov/dspace/bitstream/2014/35171/1/93-0738.pdf) (Support for Sep. 1, 1993 date at Document PP).

Michael J. Franklin et al., "Continuous Analytics: Rethinking Query Processing in a Network Effect World," CIDR 2009, Asilomar, California (4th Biennial Conference on Innovative Data Systems Research), Jan. 4-7, 2009.

Bugra Gedik et al., "SPADE: The System S Declarative Stream Processing Engine," ACM SIGMOD 2008 (Jun. 9-12, 2008) Vancouver, BC.

Erietta Liarou et al., "Exploiting the Power of Relational Databases for Efficient Stream Processing," ACM EDBT 2009, Saint Petersburg, Russia, Mar. 24-26, 2009.

R.E. Bryant, "Data-Intensive Supercomputing: The case for DISC," Carnegie Mellon University CS-07-128, May 10, 2007.

R. Chaiken et al., "SCOPE: Easy and Efficient Parallel Processing of Massive Data Sets," ACM VLDB 2008, Auckland, New Zealand (Aug. 24-30, 2008).

Hung-chih Yang et al. "Map-Reduce-Merge: Simplified Relational Data Processing on Large Clusters," ACM SIGMOD 2007, Beijing, China (Jun. 12-14, 2007).

Greenplum, "Greenplum MapReduce for the Petabyte Database," 2009.

Greenplum, "A Unified Engine for RDBMS and MapReduce," Oct. 6, 2008 (Whitepaper) (Support for Oct. 6, 2008 date at Document QQ).

Webpage from www.springer.com to support Jul. 15-17, 2010 date for Document G (available Dec. 20, 2010 at www.springer.com).

Webpage from www.springer.com to support Aug. 31-Sep. 2, 2009 date for Document I (available Dec. 20, 2010 at www.springer.com).

Webpage from www.springer.com to support Nov. 9-14, 2008 date for Document J (available Dec. 20, 2010 at www.springer.com).

NASA Jet Propulsion Laboratory, "BEACON eSpace" Website page to support Sep. 1, 1993 date for Document DD ("Fayyad, et al.") (available as of Oct. 18, 2010 at http://trs-new.jpl.nasa.gov/dspace/handle/2014/35171).

Beye Network, Website page to support Oct. 6, 2008 date for Document LL (available as of Oct. 20, 2010 at http://www.b-eye-network.com).

* cited by examiner

SYSTEM AND METHOD FOR DATA STREAM PROCESSING

CROSS-REFERENCE TO RELATED APPLICATIONS

This application is a continuation-in-part of and claims the benefit of co-pending U.S. patent application Ser. No. 12/888,427, entitled "A Query Rewind Mechanism for Processing a Continuous Stream of Data", filed on Sep. 23, 2010. The entire application is expressly incorporated by reference into the present application as if fully stated herein.

BACKGROUND

Database management systems have long existed, but traditionally they have operated on bounded data. Bounded data comes in fixed sets. The words in a book and the names of all people who attended high school in 1992, for example, represent fixed sets of bounded data.

In contrast to bounded data, stream data is unbounded and is created in systems in continuous flows. Trade orders in a stock trading system and "call detail records" in a telecommunications system are both examples of data streams that are generally large in scale. The field of business intelligence (BI) has developed to "mine" large-scale continuous data in business settings and create applications to aid in decision-making processes.

In BI and in the more general field of data analytics, there is great interest in creating systems to efficiently handle the processing of data streams.

Figure 1A:
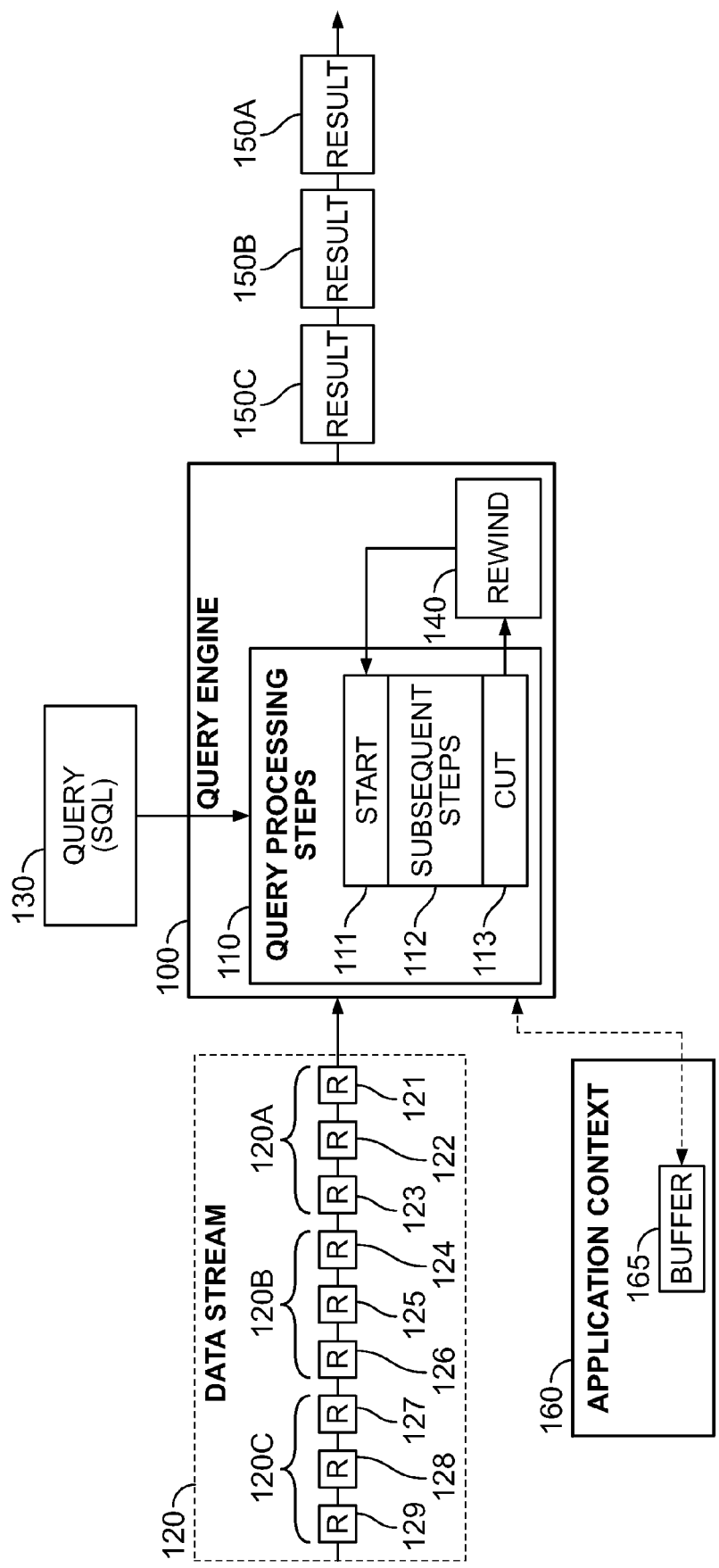
FIG. 1A is a conceptual illustration of a system having a cut-rewind procedure to allow continuous query processing, according to embodiments of the invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, for example comprising processors, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may provide a system and method for processing stream data using a query that may trigger a cut-rewind (C-R) procedure by a query engine. The cut-rewind procedure may allow the processing steps of a query to execute in continuous cycles without terminating or "shutting down." As such, the query processing steps operate as a "continuous query" (CQ) for constant operation on a data stream.

A data stream may be any type of unbounded flows of data (e.g. records) from stream sources, such as data coming from telecommunications systems, stock trade and other order systems, data management systems, "click stream" monitoring systems, sensor networks, and scientific or other monitoring systems. Record data (records) may be or include "tuples" or ordered lists of data elements. A data stream may be divided into portions or "chunks" for processing. The cut-rewind procedure may allow a query processing engine to "cut" (or halt) execution of the query processing steps based on some data item (or "granule") found, thereby "cutting" (or halting) the processing on one portion or chunk of the data (e.g. a part of the data), and then "rewind" the query, without terminating it (or shutting it down) to process a next portion or chunk in a new cycle.

A cut-rewind procedure according to embodiments of the present invention may provide useful improvements on currently-available techniques for processing data streams. Database management systems have traditionally operated on a "store-first, analyze later" methodology that works on bounded data, not stream data. There has been a movement in data analytics to create applications with low latency, but in general the focus of development has been on bounded data processing. For example, In-Database (In-DB) systems allow developers to perform calculation-intensive applications at the database (data warehouse) and avoid data movement that slows response time in querying systems developed apart from the database. However, In-DB systems continue in general to work on bounded data.

Related systems, such as "Operational Data Store" and "Enterprise Data Warehouse", may be designed for large-scale data processing, but those systems, as commercially-available, again typically follow the "store-first, analyze-later" methodology and also generally operate on bounded data.

Additionally, Map-Reduce (M-R) is a programming model for analyzing large amounts of data using parallel processing computers and has been implemented in systems such as "Google M-R" and "Hadoop M-R". Although Map-reduce was developed apart from query-based data processing systems, it has been applied to structured query language (SQL) querying systems. However, the basic map-reduce model, like a traditional SQL query processing model, is not generally compatible with processing stream data.

Other systems, such as data stream management systems (DSMS) and "iterative" M-R systems have adopted processing methodologies (such as workflow-like service models) that prohibit efficient handling of stream data. In addition, DSMS systems and iterative M-R systems commercially-available today may be built separately from the database engines that initially collect the data. Like the "store-first, analyze-later" systems described above, time consuming data transfers are typically involved with the separately-built DSMS and iterative M-R systems.

As applied in a map-reduce process (for example) and in other database processing situations, the technique of cut-rewind for a continuously processing query according to embodiments of the invention may provide processing advantages over currently available systems.

In performing a query rewind and not terminating query processing steps according to embodiments of the invention, the database engine may save all or part of the application context of the query's processing (some or all of the storage elements, e.g. data buffers, used while executing the query) at the point the query processing steps were halted. Rewinding instead of terminating query processing allows application context storage elements (data buffers) to be preserved, which permits history-sensitive data such as "running tallies" and "moving averages" to be preserved. Saving data for such history-sensitive operations may be useful in analyzing data from a data stream. The data may be preserved and maintained across processing cycles as the query rewinds and is re-applied to stream data portion-by-portion or chunk-by-chunk (e.g. so that in part-by-part processing the data is preserved).

With data from the application context maintained, stream data may be processed using one, single, long-standing instance of the same query. The query, then, may be a truly continuous query (CQ) constantly in operation, which is in contrast to other types of queries (which also may be known as "continuous queries") which are terminated and re-initiated multiple times instead of being started once and then rewound. A query using C-R may allow a stream of data to be analyzed across cycles in a cohesive manner. A single long-standing instance of a query executed through a C-R process may be used, rather than, for example, multiple one-time query instances.

In different embodiments, a system and method for preparing a database system for data stream processing using a cut-rewind procedure also may be provided.

To enable stream processing using a query engine (which is traditionally used for processing bounded, non-stream data), embodiments of the present invention may provide for extending the query engine to include "stream source functions" (SSFs) to gather data from stream portions. A traditional query engine may use a "table scan function" (also known as a "scan function" or "scan operator") to look for records stored in a database table. Embodiments of the present invention may allow a query engine to work with data streams instead of tables however. An SSF may return a sequence of records (tuples) from a data stream to feed query engine processing without first storing records on a disk (or on a table).

To further enable stream processing, embodiments of the invention may further extend the query engine to allow and enable "user-defined buffer functions" (UDBFs). UDBFs may include storage elements (e.g. buffers) for storing data that can be maintained across processing cycles. In processing a bounded data set, a query will generally execute across an entire, finite set of data in one "transaction". In such circumstances, there is less concern with history-sensitive operations such as providing a running tally or moving average, because a final result is achieved at the end of the transaction. Because a data stream is inherently infinite and its processing by query cannot yield definitive analysis results for the entire stream in one "transaction" (which would be impossible for an infinite stream), history-sensitive data, such as running tallies or moving averages may be useful in analyzing stream data.

UDBFs may store either raw data or intermediate processing results (which may be used for history-sensitive operations like the running tally or moving average). Such storage may also allow for the use of "emitters" or other notification elements to broadcast notification of history-sensitive data events. In one example, UDBF buffers may be considered part of the application context. As such, the UDBF may be saved or maintained in a query rewinding process. A UDBF may be created as an SQL-allowable "user-defined function" (UDF), where the function includes a storage element, such as a data buffer. An SQL query may be written with expressions that may contain references to an SSF and a UDBF. Such a query may be parsed, optimized and compiled for query engine processing and may facilitate data stream processing using a cut-rewind process.

By rewinding and not terminating the query (i.e. not "shutting the query down") and by allowing UDBF buffers to be maintained as part of the application context, the contents of the UDBF buffers may be continued though the query's processing execution cycles. The saving of history-sensitive data in UDBF storage elements (such as buffers) may provide "whole stream" continuity for history-sensitive functions. Such "whole stream", history-sensitive functions are generally lacking in conventional SQL.

A query with C-R may be added to or integrated with a database processing system that maintains a data warehouse, thereby allowing data analysis processing (data analytics) to be applied to stream data as a part of In-Database (In-DB) processing. In one In-DB processing example, a database query engine using a query with C-R may perform "just-in-time" analytics on the stream data, where the database is maintained. Stream processing and analysis may occur just before the data is warehoused (stored to disk).

Embodiments may permit stream results to be made available or "committed" to a database or a client application (e.g.

a data analytic application) on a cycle-by-cycle basis, where, for example, SQL commands such as "SELECT INTO" and "INSERT INTO" may be extended to support cycle-based query execution. Further, an approach may be used that makes it possible to have data results both persisted (saved to the database) and streamed out externally (sent to a client application) in one command sequence.

A query with cut-rewind mechanism may further be used to implement a map-reduce (M-R) data stream processing application, for example, using the processing clusters of a parallel processing computer system. In such a map-reduce model, some of the clusters may perform a "map" function on portions of the data. Other clusters may receive the results of the map clusters and perform a "reduce" function on the data. A query with cut-rewind (C-R) may be used to implement M-R in an In-DB system.

In embodiments to perform M-R, an SQL query may be created to express the map and reduce functions. The SQL query may include a "relation valued function" (RVF) or a set of SQL statements, to express the steps of map and reduce. An RVF is an SQL allowable user-defined function (UDF) that allows a function, either for map or reduce or other computation, to receive "tuple set" arguments (a set of tuples) and return a tuple-set in order to carry out map, reduce or other computations, where relational transformations may occur in the query processing pipeline. One form of an RVF is a "table value function" which receives a single tuple and returns a set of tuples. An RVF may be used for each of the map and reduce function (where a "table value function" may be used for the map function, because the function may take in just one record (one tuple) and may "map" it to a set of tuples). In addition, to facilitate an M-R for stream data, an exemplary implementation may include the use of stream source functions (SSFs) for gathering stream data and user-defined buffer functions (UDBFs) for handling history-sensitive operations.

For example, a map function may be created as an RVF (e.g. table value function) and a reduce function may be created as an RVF with UDBF capabilities. Though RVFs may be used for map-reduce, other SQL statements or UDF programming may also be used as well.

M-R systems using queries with C-R, for example, may be implemented in many different data stream processing applications, such as those in telecommunications, stock trade, data management, "click stream" or other scientific or monitoring systems. M-R systems using queries with C-R may be implemented in business intelligence (BI) applications.

In one embodiment, the invention may provide a system for sensor monitoring. As one example, the invention may provide a system for monitoring vehicle exhaust emissions in a city. In such an embodiment, a parallel processing database management system may be used to provide an In-DB M-R system using a query with C-R for processing vehicle exhaust sensor data.

Many other examples of data processing using a continuous query with cut-rewind mechanism are also possible.

Example Embodiments of Cut-Rewind Procedure

Reference is made to FIG. 1A, which is a conceptual illustration of a system having a cut-rewind procedure to allow continuous query processing, according to embodiments of the invention. FIG. 1A shows query engine 100 executing query processing steps 110 to process data stream 120.

Data stream 120 may be a continuous flow of records (tuples) 121, 122, 123, . . . , 129, such as the records from a telecommunications, stock trading, traffic monitoring, sensing, tracking or other data stream collection/generating system. FIG. 1A shows records 121-129 arriving in a continuous stream.

Query engine 100 may be part of a relational database management system (RDBMS) and may include software components and processors for executing query language statements and expressions. For example, query engine 100 may be operating on a single computer or multiple computers executing as a parallel processing system. Other hardware configurations are also possible. Query processing steps 110, being executed by query engine 100, may have been derived from query 130. A user, for example, may have written query 130 using SQL language statements. A parser, optimizer and compiler (not shown in FIG. 1A), may have been used to generate query processing steps 110 based on the expressions in query 130.

Query engine 100 may capture records 121-129 and process them using a cut-rewind (C-R) procedure. The C-R procedure may allow query processing steps 110 to be applied to records 121-129 in a cyclical fashion, such that data stream 120 may be processed in portions or "chunks" (e.g. so that cycle-by-cycle the data is processed part-by-part).

To facilitate C-R, query engine 100 may include a rewind function 140. Query processing steps 110 may include a cut function 113. In FIG. 1 cut function 113 is shown within query processing steps 110 and rewind function 140 is shown as part of query engine 100, but other configurations (such as cut function 113 being a function within the query engine 100 for example) are also possible.

Cut function 113 may facilitate the portioning or "chunking" of data, and thereby partitioning it, according to a cut condition. A cut condition may be a condition such that on the occurrence of some event (such as the finding of some data item (or "granule")), a halt or stoppage of query processing occurs. Cut function 113 may check for the occurrence of the cut condition while query engine 100 also executes other query processing steps 110.

Query engine 100 may read (or capture) records 121-129 from data stream 120 one at a time (or alternatively in groups) and process them until a cut condition occurs. After each "cut" there may be a "rewind". When a cut condition is signaled, the system may output the results and rewind for the processing of a next portion or "chunk" of the data (and thus part-by-part the data stream will be processed).

For example, query engine 100 may process records 121, 122, 123 as one portion or "chunk" (120A) and may provide processing results 150A. Then, after a rewind, query engine 100 may process records 124, 125, 126 as a second portion or chunk (120B) and may provide processing results 150B. After a second rewind, query engine 100 may process records 127, 128, 129 as a third portion or chunk (120C) and may provide processing results 150C.

Many different kinds of cut conditions are possible in performing a cut-rewind procedure. In one example, cut function 113 may have a cut condition based on a preset processing time frame (e.g. a "cut" may be signaled after the query engine has processed for five minutes). In another example, cut function 113 may have a cut condition based on cardinality (e.g. query engine 100 may process a first set of 1000 records and then "cut" and signal a rewind before processing a second set of 1000 records, etc.) In such a situation, each 1000-record block represents a portion or a "chunk".

In a further example, cut function 113 may have a cut condition set based on some data item (or granule element) found in each record, such as time stamp data found in the records. Records 121-129 in data stream 120, for example, may contain a time stamp as to when each record was collected or captured. In such an example, cut function 113 may be set to process, for example, in one-minute intervals based on the record time stamp data.

Records 121-123 in such an example may have a time stamp of "t1" (see e.g. 120A) and may be processed as one portion. Additionally, records 124-126 and records 127-129 in such an example may have a time stamps of "t2" and "t3", respectively (see, e.g., 120B and 120C), and may be processed as second and third portions.

Rewind function 140 may allow a series of instructions to be undone or rewound upon the occurrence of a cut. For example, in processing portion 120A, query engine 100 may have begun executing query processing steps 110, beginning with start step 111. In processing portion 120A, query engine 100 may have further proceeded to execute subsequent steps 112 before cut function 113 signals a "cut". In such a case, rewind function 140 may allow query engine 100 to rewind or undo subsequent steps 112 and return to start step 111. Then, when processing the records of the next portion (e.g. 120B), query engine will continue execution starting again with step 111.

Rewind function 140 may also allow for saving particular data when query processing steps 110 are rewound. Query engine 100 may maintain application context 160 during the time that it is processing. Portions of application context 160 may be saved or maintained, even after a rewind.

An application context may be the current status or configuration of the memory, buffers, registers and processor execution states within a computer during the running of an application or a program such as the running of query processing steps 110 by query engine 100.

In embodiments of the invention, query engine 100 may execute query processing steps 110 on multiple portions 120A, 120B, 120C (e.g. in multiple cycles). And in such processing, query engine 100 may maintain (and not delete) elements of application context 160 (such as processing buffer 165) after each execution of query processing steps 110.

As query engine 100 executes query processing steps 110, for example in processing portion 120A, application context 160 may be formed. Application context 160 may include data written to processing buffer 165. Data written to buffer 165 may include analytic processing information such as averages of the data processed during the cycle and it may include data stream history-sensitive information such as a running tally or a moving average.

Query engine 100 may be configured, for example, to trace (or save) applications contexts (including execution states) continuously, including the state of buffer 165. Elements of the application context 160, such as buffer 165, may be preserved or maintained across multiple executions of the processing instructions 110. Retaining the continuity of the application context may allow for "sliding window" and history-sensitive operations. Further, history-sensitive data, such as a moving average may be output.

Figure 1B:
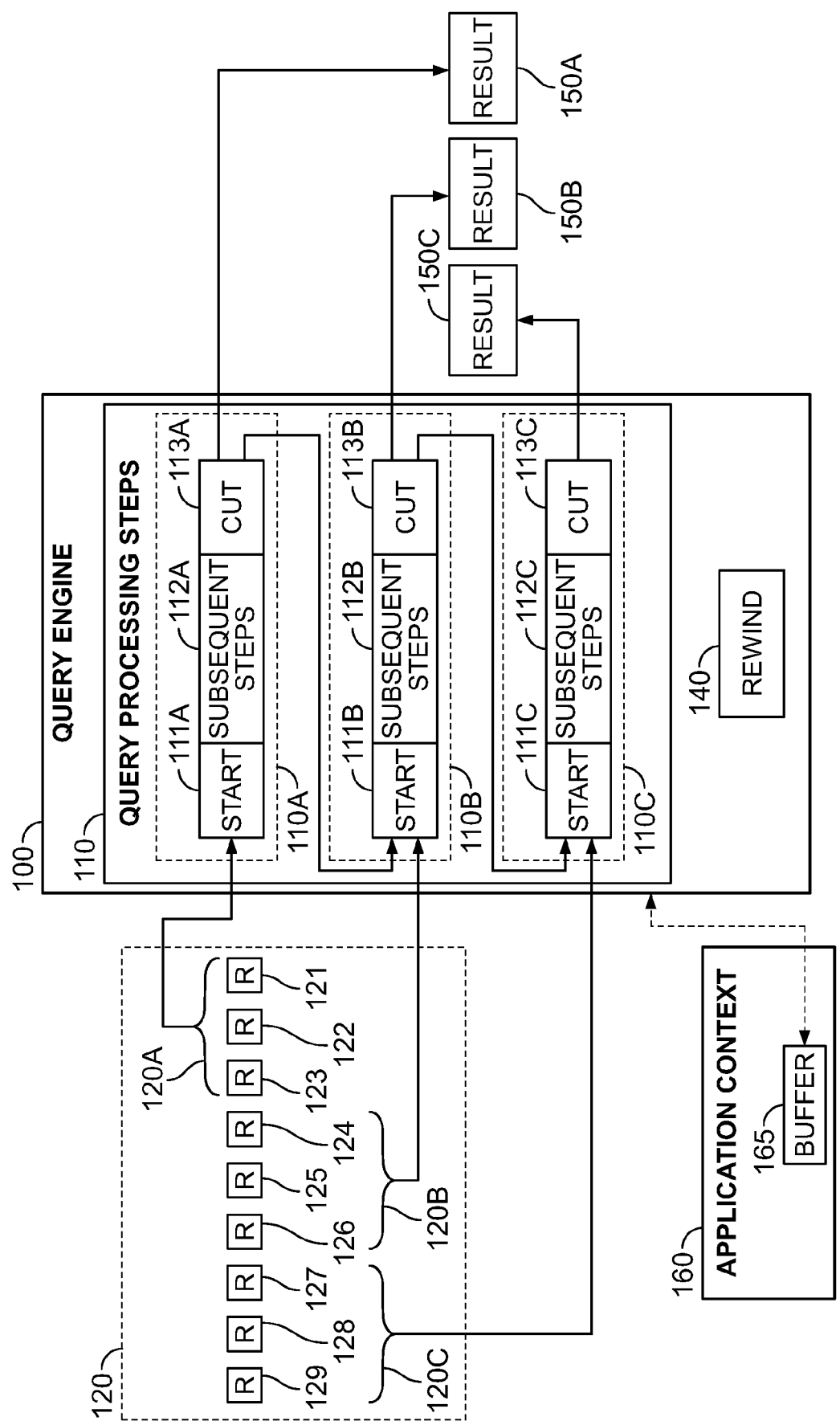
FIG. 1B is a conceptual illustration of a query engine applying query processing steps in multiple "rewind" cycles, according to embodiments of the invention.

Reference is now made to FIG. 1B, which is a conceptual illustration of query engine 100 applying a cut-rewind (C-R) procedure in multiple "rewind" cycles while maintaining application context elements, according to embodiments of the invention. FIG. 1B shows query engine 100 executing query processing steps 110 to process data stream 120 in a number of cycles 110A, 110B, 110C.

For example, cycle 110A may process portion 120A until, for example, a "cut" condition is reached. Cycle 110A may begin at step 111A, perform subsequent steps 112A and then an instance of cut function 113 (executed as 113A) may signal the occurrence of a cut condition. Query processing steps 110 may then be "rewound" to restart execution of processing steps 110 in cycle 110B, without, however, deleting or re-setting buffer 165 of application context 160. Cycle 110B may then process portion 120B (beginning at start step 111B and performing subsequent steps 112B) until an instance of cut function 113 (executed as 113B) signals a cut condition. Processing in cycle 110B may have added data to or changed data in buffer 165. Query processing steps 110 may then be "rewound" to restart their execution in cycle 110C without deleting or re-setting buffer 165 as it existed at the time of the cut condition at 113B.

Query processing steps 110 may continue processing steps 110 in cycle 110C, beginning at start step 111C, performing subsequent steps 112C until cut function 113 (executed as 113C) signals the occurrence of the cut condition. In performing steps 111C-113C, query engine 100 may further add or change data in buffer 145. In such a manner, data may be preserved across processing cycles. Because the cycles can be continued indefinitely, query 120 may be considered to be a continuous query (CQ).

Figure 2:
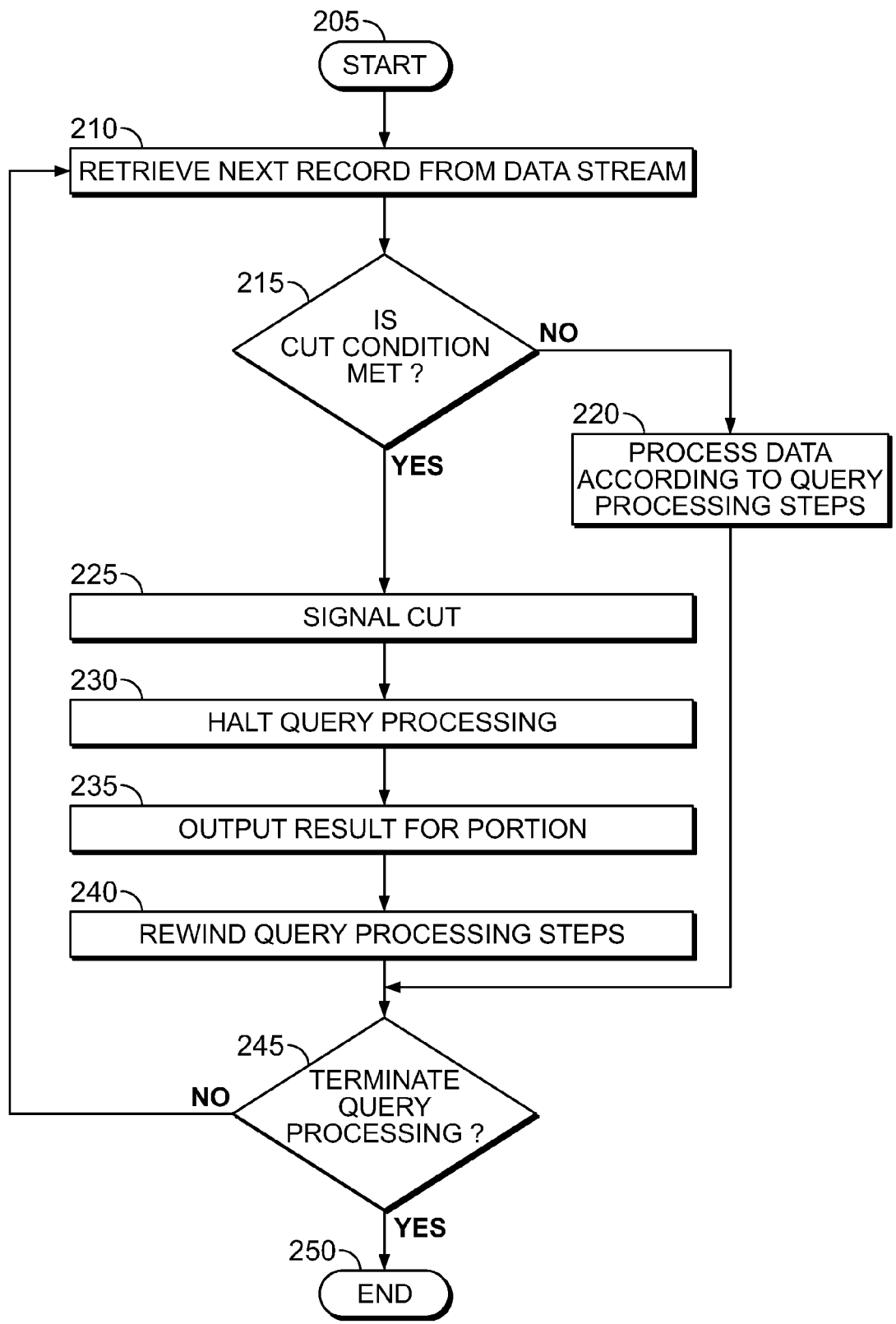
FIG. 2 is a schematic flowchart of a process for a cut-rewind procedure, according to embodiments of the present invention.

Reference is now made to FIG. 2, which is a schematic flowchart of a process for a cut-rewind (C-R) procedure according to embodiments of the present invention. In FIG. 2 a processor, such as a processor executing query processing steps 110 with query engine 100 (FIG. 1A) may execute the steps in FIG. 2. In step 205, processing begins and in step 210 the processor (e.g. executing a cut function such as 113) retrieves the next record from a data stream (e.g. 120). In step 215 the processor determines whether the cut condition has been met. As stated above, in different embodiments there may be different types of cut conditions, for example, cut conditions based on processing times, cardinality or data within the data stream records. In this example, the cut condition may be based on data within the record, such as a time stamp. The processor may check the record to see if its data triggers a cut condition.

If the data in the record does not trigger a cut condition, the processor proceeds to step 220 to process the record using the processing steps of a query (for example query processing steps 110 from FIGS. 1A, 1B). After the record has been processed (e.g. using query processing steps 110), the processor proceeds to step 245 to determine if query processing should be terminated. If no, the processor returns to step 210 to retrieve a new record for processing from the data stream. If yes, the processor will end the process in step 250.

If in step 215 (e.g. while executing cut function 113), data within the record triggers a cut condition (for example, if the record had a time stamp showing a minute value that is later (higher) than the time stamp that is supposed to be used for processing records in the current processing cycle), the processor may signal a cut condition in step 225. In step 230, the processor may halt processing of the query steps (query processing steps 110). In step 235, the processor may output the result for the portion of data that was being processed before the cut condition had occurred. Such output may correspond to outputs 150A-150C in FIGS. 1A-1B. At this point, a "cut" has occurred and the processor may now "rewind."

In step 240 the processor may rewind, without shutting down, the query processing steps (for example steps 110). The processor in step 245 may determine if the query should be terminated. In general, a query operated with a cut-rewind mechanism would not be terminated and the processing of a data stream in portions or "chunks" would continue. The query engine in this case would be operating a continuous query (CQ). Where processing does not end, the processor returns to step 210 and retrieves another record of data from the data stream.

Processing continues in this manner, and could continue indefinitely. If in step 245, query processing is to be terminated (e.g. because there is no more data or there is a system shutdown), the processor proceeds to step 250 to end processing.

Example Query and System Preparation

In addition to executing a query that triggers continuous execution with cut-rewind, embodiments may also provide a method for preparing a query that may trigger a cut-wind procedure. As stated above, query processing steps 110 in FIGS. 1A and 1B above may have been derived from a query written in a data manipulation language such as SQL (see query 130 and query processing steps 110, FIG. 1A). A system and process may be presented in preparing a query written in a language such as SQL and deriving processing steps (e.g. 110) that are executable by a query engine (e.g. 100) and that may include elements to trigger a cut-rewind process.

Figure 3:
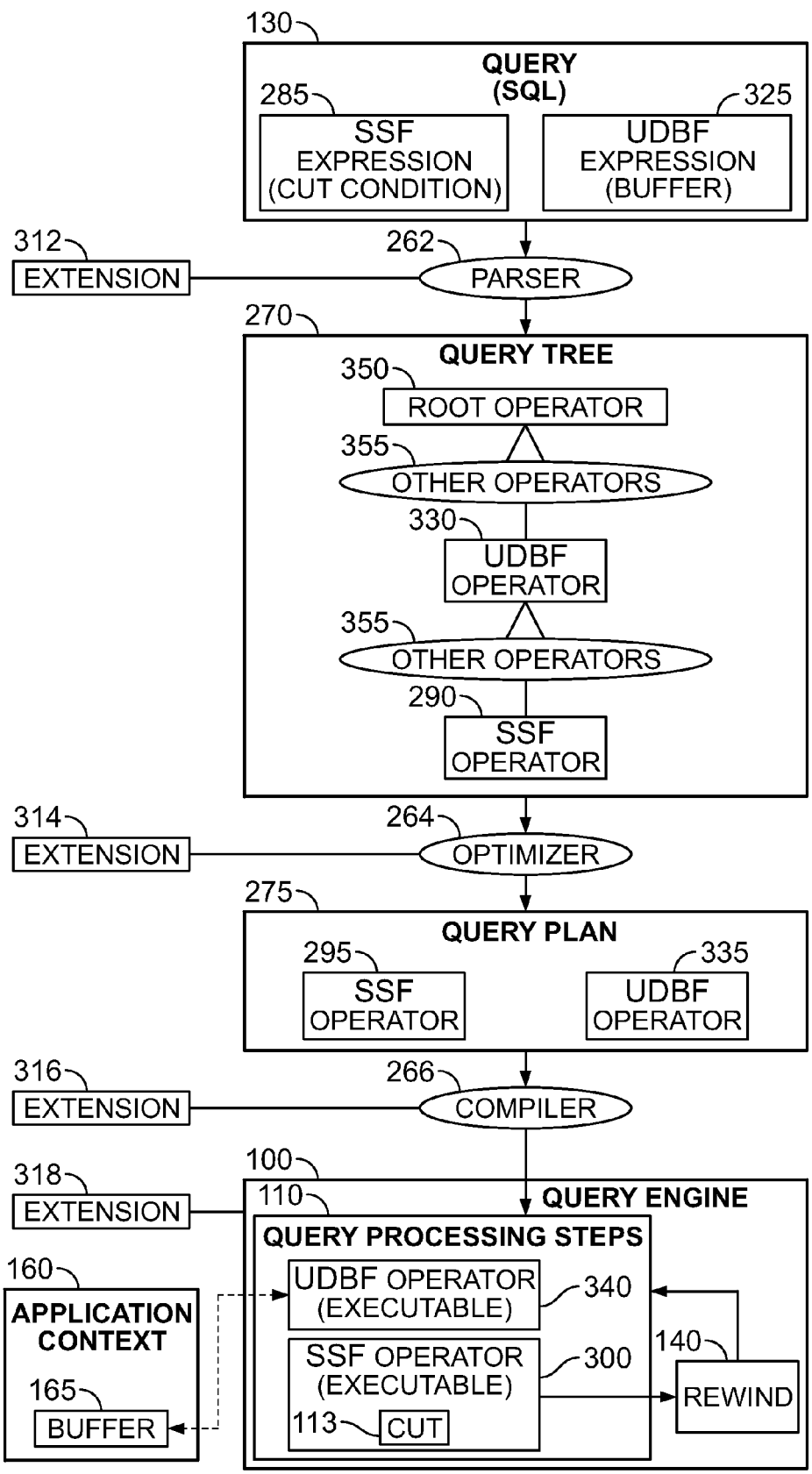
FIG. 3 is a conceptual illustration showing the preparation of query processing steps for execution in performing continuous processing of a data stream, according to embodiments of the invention.

Reference is now made to FIG. 3, which is a conceptual illustration showing exemplary steps in deriving query processing steps 110 from query 130. Query 130 may be a set of written query language statements or expressions (for example written by a person) used, for example, for retrieving information from a database.

Query 130 may contain written expressions that when processed by parser 262, optimizer 264 and compiler 266 may create query processing steps 110 for execution by a computer processor using query engine 100. Query 130 may be written in structured query language (SQL) statements, such those allowable with Oracle, Microsoft SQL, IBM DB2, Sybase, MySQL, PostgreSQL Teradata, Infomix or Ingres server systems.

Parser 262 may be a program that receives the written expressions in query 130 and breaks the statements up into parts that can then be managed by other components in the optimization and compilation processes. Parser 262 may check to see that the written expressions follow the necessary syntax and/or grammar allowed for the SQL language being used. Parser 262 further may create query graph model or "query tree" 270, which may contain the semantics (significant relations) of the query, including for example query blocks, sub-queries, correlations between relations, derived tables, expressions, data types, data type conversions, code page conversions, and partitioning keys.

Optimizer 264 may use query tree 270 to generate a number of alternative execution plans for satisfying the query. Because SQL is a high-level declarative language, there may be a large number of alternative ways to implement the expression of a query when it is transformed into executable code. Optimizer 264 may generate a number of different execution plans for query 130 (based on query tree 270) and may provide estimates of the execution costs for each alternative plan (in terms of time and computing resources). Optimizer 264 may choose the plan with the smallest estimated execution cost.

Optimizer 264 may output query plan (or execution plan) 275, which may be an ordered set of steps to perform the expressions set out in query 130. Compiler 266 may generate from query plan 275 executable code which becomes query processing steps 110.

Within such a system, additional expressions may be added to query 130 that, when processed by parser 262, optimizer 264 and compiler 266, may provide query processing steps 110 to perform stream data processing with continuous cut-rewind functionality.

Query 130, for example, may include an expression for a cut function (e.g. cut function 113, FIG. 1A, 1B). Further, query 130 may include an expression that allows for the generation and storage of history-sensitive data such as a running tally or moving average that may be useful in analyzing data from a data stream. Such expressions when processed into query processing steps 110 may operate with rewind function 140 of query engine 100 to provide cut-rewind functionality.

Example Stream Source Function Expressions

In one embodiment, a cut function 113 may be expressed in query 130 through the use of a "stream source function" (SSF). A SSF may allow stream data to be collected and a SSF may further incorporate the signaling of a cut condition (such as a cut condition based on time, cardinality or time stamps). Traditionally, SQL queries process data in table form, not however, in stream form. Where traditional SQL processing may use "scan" operators to search tables in databases for data, an SSF may provide stream read and event monitoring functionality and may allow "function" scan to replace "table" scan for stream processing.

FIG. 3 shows SSF expression 285 within query 130. SSF expression 285 may provide query-based expression for cut function 113 and, in addition, provides an expression for accessing data from a data stream. As one example, SSF expression 285 may have a form such as:

SSF_stream([interval])

Where "SSF_stream" is the name of a function recognizable to parser 262, optimizer 264 and compiler 266 and which corresponds to executable code that can be used by a query engine (e.g. 100) to gather data from a data stream and determine the occurrence of a cut condition (e.g. time, data time stamps or cardinality). "[interval]" may be a window set for gathering data records in a portion or "chunk" of data (e.g. SSF_stream("60") may gather all records having time stamps within a 60-second interval). The cut condition may be based on the 60-second interval.

The SQL syntax may include statements such as "SELECT" and "FROM" that can be used in query expressions. Conventionally, "SELECT" and "FROM" statements may be used to select or retrieve data from a database. An SQL expression such as:

SELECT . . . FROM [table]

in conventional SQL may retrieve a list (e.g. a column) located in "table". Extensions 312, 314, 316, 318 at the parser 262, optimizer 264, compiler 266 and query engine 100 levels, respectively may allow SSF expression 285 to provide stream data capturing and cut condition-signaling functionality within the context of the SQL statement grammar. An SQL expression may be written that incorporates an SSF such as:

SELECT . . . FROM SSF_stream(60)

where SSF_stream(60) retrieves records from a data stream and signals a cut condition, for example, when no more records have a time stamp that falls within the 60-second interval used to capture records.

When parsed, SSF expression 285 may be linked to SSF operator 290 within query tree 270. Query tree 270 may represent the logical steps needed for query engine 100 to execute the expressions in query 130 on a computer. Query tree 270 may contain references to one or more physical operators, which may be computer processes or functions that actually implement query operations. For example, a "join" (for joining a table) is an example of a logical query operation, and query tree 270 may contain links to "nested loops join" routines, which are the physical operators that would actually perform the "join."

Query tree 270 may contain a root operator 350, a "top-level" function that returns the final result (what the SQL query was trying to find), and various other operators (collectively 355) to execute the query. At the bottom of query tree 270 is SSF operator 290 that accepts events to generate stream elements. SSF operator 290 may be considered a "leaf" node of query tree 270 and SSF operator 290 may be the first process to work on the stream data.

When optimized, SSF expression 285 may be further linked to SSF operator 295 within query plan 270. (Query plan 270 may also follow a tree structure which is not shown in FIG. 3). When executables are generated from query plan 270 (e.g. by compiler 266), query processing steps 110 may include SSF operator 300 (an executable) which may include the ability to signal the occurrence of a cut condition along with data stream reading capability.

In different embodiments, SSF operator 300 may be defined to continuously read data records from a data stream. SSF operator 300 may also be called by query functions (other query operators) and SSF operator 300 may provide stream data to those other functions.

SSF operator 300 may be configured to "listen" for (or read) data stream events. For example, SSF operator 300 may read the timestamp on incoming records from a data stream and "cut" data stream after an interval after reading the events. SSF operator may, for example, "cut" the stream every minute based on the record timestamps. In reading data and/or events from the data stream, SSF operator 300 may also capture data (e.g. records) from the data stream and generate data stream elements and provide to other program elements to allow query analysis of the data. In one embodiment SSF operator may generate and provide the data stream elements tuple-by-tuple (e.g. one tuple at a time with the SSF operator 300 reading from the data stream record-by-record). Other embodiments are also possible, such as where SSF operator 300 delivers data stream elements in groups or sets.

SSF operator 300 may be specified such that it may be called multiple times during the execution of a continuous query cycle. Each time SSF operator 300 is called, it may return one tuple from a data stream. Thus, in execution, SSF operator 300 may be called many, many times and infinitely on an infinite data stream.

SSF operator 300 may also be defined to signal the occurrence of a cut condition. SSF operator 300 may search or monitor for an "end-of-cycle" event, such as the end of a processing time interval or the end of certain time-stamped data in the data stream. When an end-of-cycle event is seen, SSF operator 300 may signal that a cut condition has occurred, such as by, for example, signaling query engine 100 to terminate the current query execution cycle.

Example User-Defined Buffer Function Expressions

In addition to the expression of a cut condition through a function such as an SSF, embodiments may provide for the expression of a function for storing history-sensitive data, such as data for running tallies or moving averages. Such a function may allow such history-sensitive data to be maintained across execution cycles as query engine 100 processes a data stream.

In one embodiment, a function for storing history-sensitive data may be provided by a "user-defined buffer function" (UDBF). A UDBF may include a storage element (such as a buffer) for storing data, which may be carried across processing cycles. Use of stream-oriented history-sensitive functions (or operators) may be useful for data stream implementations. For example, in processing a stream of data over time, it would be useful to provide a moving average of the data (an average of all data processed to date) instead of just a single average at the end of processing.

While a typical SQL engine may contain a number of built-in functions (or operators) to provide general data analysis (such as "AVG( )") stream history-sensitive operations may not be generally not supported.

In SQL, a user-defined function (UDF) may be an accepted mechanism to extend query functionality. UDFs may be used in different embodiments to provide UDBF a with history-sensitive stream processing. FIG. 3 shows UDBF expression 325 within query 130. UDBF expression 325 may provide a reference to a UDF having a storage element such as a data buffer in its function closure. As one example, UDBF expression 325 may have a form such as:

get_moving_average([minute], [average])

where "get_moving_average" is the name of a function recognizable to parser 262, optimizer 264 and compiler 266 and which corresponds to executable code that can be used by a query engine (e.g. 100) to store the [minute] and [average] values (providing an average for processing stream data for a specific minute) and compute in return a moving average over a period (such as a 10-minute period or the last ten "minute" processing cycles). An SQL expression may be written that incorporates a UDBF such as:

SELECT get_moving_average([minute], [average])
FROM . . .

In the example above, FROM may provide data to SELECT from a source that operated on stream data to compute an "average" for the "minute". SELECT may obtain the moving average.

When parsed, UDBF expression 325 may be linked to UDBF operator 330 within query tree 270 (shown within query tree 270 as a "branch" node with other branch operators (collectively 355)). When optimized, UDBF expression 325 may be further linked to UDBF operator 335 within query plan 275. When executables are generated from query plan 275 (e.g. using compiler 266), processing steps may include UDBF operator 340 (an executable), which may include buffer 165 (shown in FIG. 3 as within application context 160). Rewind function 140, which may be provided in an extension such as 318, may allow the storage element (e.g. buffer 165) accessed by UDBF operator 340 to be maintained across processing cycles.

A UDF with a storage element, such as a data buffer, may be used for caching stream processing data and state information (e.g. synopsis information summarizing the processing history of the operator associated with the buffer). Such a UDF may be used as UDBF operator 340. Furthermore, it may also be possible to use UDBF operator 340 as an "emitter" for delivering stored analysis results to interested clients (database analysis applications) in the middle of a processing cycle. In general query processing (e.g. a query processing on a bounded data set), no query results are made "visible" (e.g. made available to a client application) until the query processing has complete. A UDBF used as an "emitter" (for example, to broadcast results, to a client application) may allow history sensitive data, such as a running tally or moving average, to be made available during the running of a continuous query. Such an "emitter" function may also be useful in creating stream applications with low latency requirements.

In one embodiment UDBF operator 340 (executable) may be implemented as a scalar UDF (a function that returns a single value), which may be called multiple times on a per-tuple basis (for example every time a stream source function obtains a tuple) during a processing cycle. Such an implantation may follow known "First_Call", "Normal_Call", or "Final_Call" UDF function call strategies. In such an example, data buffer structures may be initiated in the "First_Call" routine and used in each "Normal_Call" ("Final_Call" may not be reached with continuous query processing). UDBF operator 340, defined as a scalar UDF and used as a "window operator", may incrementally buffer stream data, and then manipulate the buffered data, for a required window operation.

Although query processing may proceed cycle-by-cycle, UDBF operator 340 may allow data to be retained between query cycles to have the data states traceable continuously. In contrast, if a stream system were made of multiple one-time query instances (where the same query was completely terminated at the end of each cycle), then it might not be possible for data to be traced continuously across cycle boundaries.

In operation, SSF operator 300 (executable) may receive data, pass it to the other nodes and signal a "cut" condition. "End-of-data" may be signaled if the cut condition is met to instruct query engine 100 to terminate the current query execution cycle and return the query results for the portion or chunk. Query processing steps 110 then may be rewound, rather than shut down and restarted, for processing the subsequent data chunk (or part) in the next execution cycle. UDBF operator 340 (executable) may perform an operation such as calculating a moving average and store history-sensitive data, such as the averages from the last 10 processing cycles in buffer 165.

Figure 4:
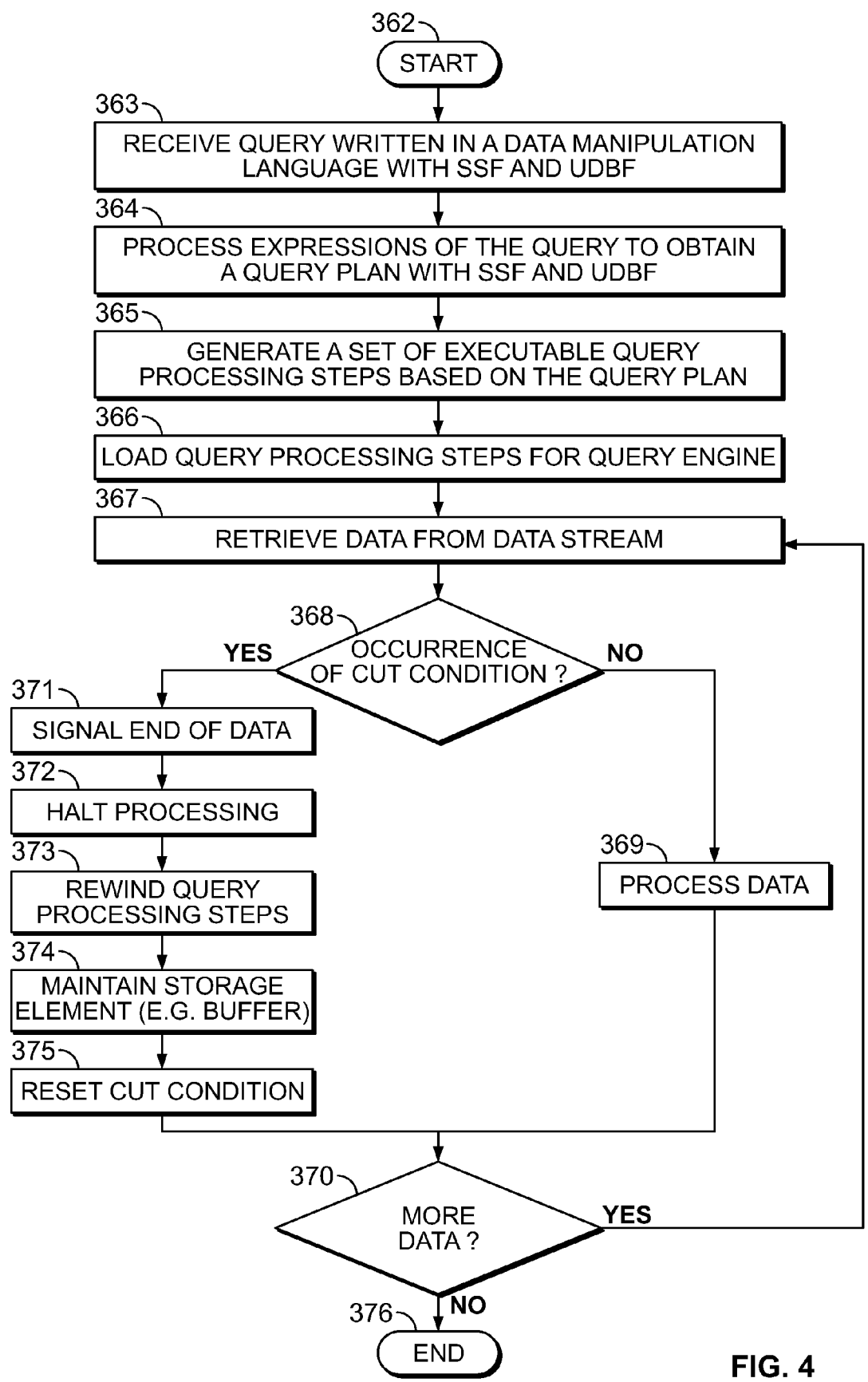
FIG. 4 is a schematic flowchart of a process for performing continuous query execution on stream data using a cut-rewind process and starting with a written query, according to embodiments of the invention.

Reference is now made to FIG. 4, which is a schematic flowchart of a process of performing continuous query execution on stream data using a cut-rewind process and starting with a written query, according to embodiments of the invention. In such a procedure a processor, such as one executing parser 262, optimizer 264 and compiler 266, may be used, and that processor may also be executing the processes of query engine 100. In other embodiments a combination of separate processors may be used for one or more of the parsing, optimizing, compiling and query processing steps.

In step 362, the process begins and, in step 363, the processor may receive a query written in a data manipulation language (such as SQL). In step 363, the query may contain written expressions of a stream source function (SSF) and a user-defined buffer function (UDBF) (e.g. a UDF with a storage element, such as a buffer).

In step 364, a processor (such as the processor(s) executing parser 262 and optimizer 264) may process the expressions of the query (e.g. by parsing and optimizing them) to obtain a query plan with SSF and UDBF operators. In step 365, a processor (such as the processor executing compiler 266) may generate a set of executable query processing steps from the query plan, which may include executable forms of the SSF and UDBF operators. In step 366, the processor may load those steps for execution by a query engine (such as query engine 100).

Following step 366, a processor (e.g. the processor operating query engine 100) may process data from a data stream. In step 367, the processor may retrieve data from the data stream executing an SSF operator (executable), such as SSF operator (executable) 300 (the SSF operator may be included in the query processing steps). The processor, executing the SSF operator (executable) in retrieving a record, may also check the cut condition to determine if processing should be halted (or stopped). For example, processor may check the time stamp of the record to see if the timestamp falls within the time window for processing that is set by the SSF operator.

If in step 368, the processor executing the SSF operator (e.g. 300) determines that the cut condition is not met (there is no occurrence of the cut condition), the processor may proceed to step 369 and processes the record according to the query processing steps. If there is more data in step 370, the processor returns to step 367 to read (or capture) the next record (e.g. using the SSF operator). Again, the processor may check to determine if the cut condition is met (e.g. checking the time stamp of the record to see if it falls within the processing window). If in step 368 the record does not fit within the "window boundary" created by the cut condition (e.g. if the record has a time stamp that does not fit within the time window of the cut condition), the processor executing the SSF operator may signal that a cut condition has occurred, whereupon the processor may signal "end-of-data" (in step 371) and halt processing (in step 372).

In step 373 the processor may rewind the processing steps (e.g. without terminating processing) while maintaining in step 374 the state of a storage element (e.g. buffer 165) within the application context (e.g. 160) which may contain history-sensitive data such as a running tally or moving average. In step 375, the processor may also reset (or update) the cut condition for the next processing cycle, moving it to the next minute.

In step 370, the processor may check to determine if there is more data to process. If so, the processor repeat the steps 367-375 while there is more data to process in the data stream or until a termination signal is received. In such a case processing ends in step 376. If, in step 370, there is more data, the processor returns to step 367 to process in a new cycle.

Figure 5:
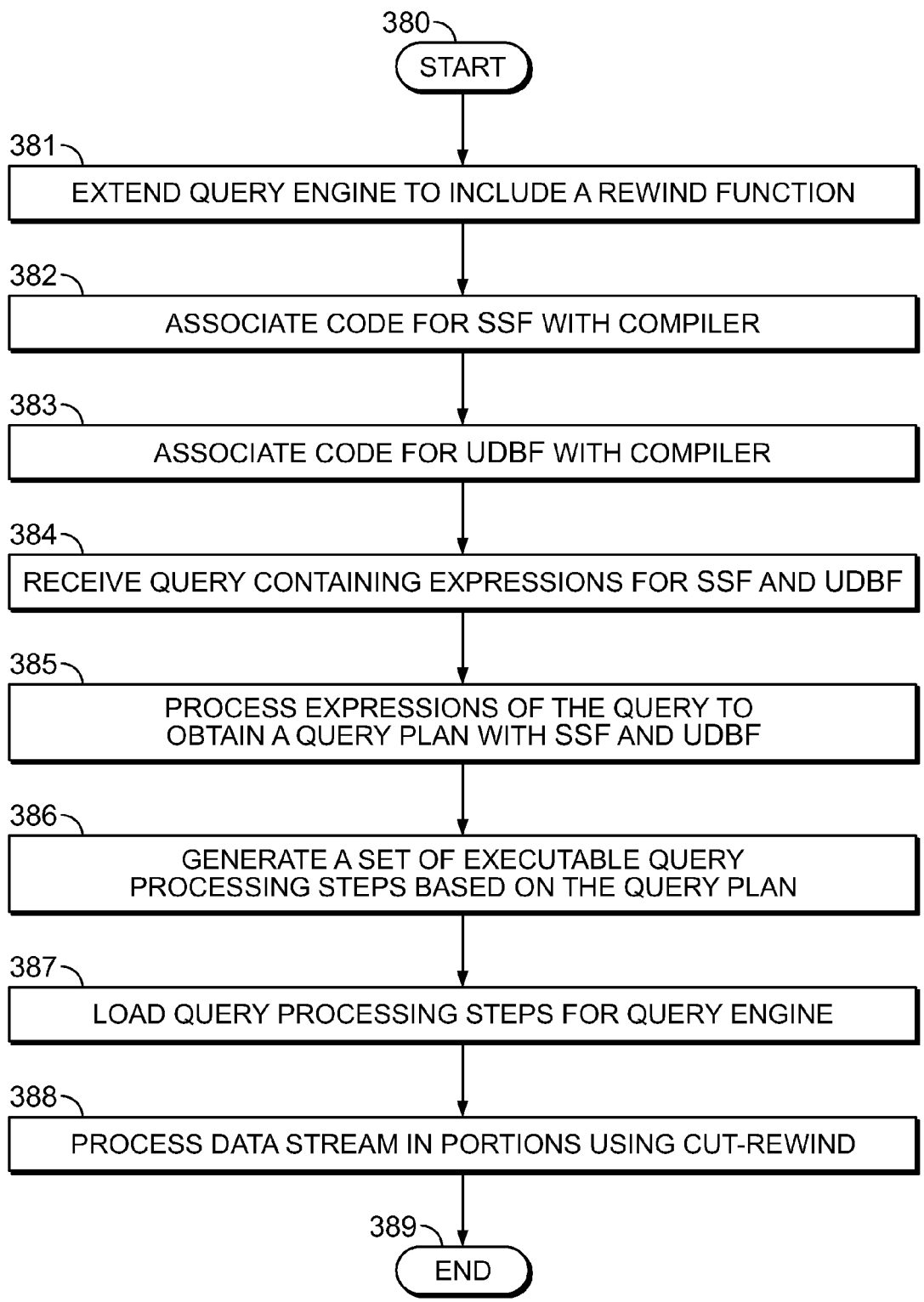
FIG. 5 is a schematic flowchart of a process for preparing a database management system for performing continuous query execution on stream data using a cut-rewind process, according to embodiments of the invention.

Reference is now made to FIG. 5, which is a schematic flowchart of a process for preparing a database management system for performing continuous query processing of stream data using a cut-rewind process, according to embodiments of the invention. In such a procedure a processor of a database management system, such as one executing parser 262, optimizer 264 and compiler 266 may be used, and that processor may also be executing the processes of query engine 100. In other embodiments a combination of separate processors may be used for one or more of the parsing, optimizing, compiling and query processing steps.

In step 380, the process begins and, in step 381, the capabilities of query engine 100 may be extended (e.g. by human or computer operations) to include a rewind function (e.g. 140). The rewind function may allow a set of query processing steps (e.g. 110) to be rewound without termination for a next processing cycle while at the same time allowing a storage element (e.g. buffer 165) of an application context to be maintained.

In step 382, program code for an SSF operator (e.g. 300) may be associated with compiler (e.g. 260). The SSF operator may execute when compiled to obtain data from a data stream and signal a processing halt upon the occurrence of a cut condition. In step 383, program code for a UDBF (e.g. user-defined function containing a buffer, such as 340) may be further associated with the compiler. The UDBF may operate to perform a history-sensitive operation such as maintaining a moving average.

In step 384, the processor (e.g. the processor executing parser 262) may receive a query written in a data manipulation language (such as SQL). The query may contain written expressions of a stream source function (SSF) and a user-defined buffer function (UDBF) (e.g. a UDF with a storage element such as a buffer).

In step 385, a processor (such as the processor(s) executing parser 262 and optimizer 264) may process the expressions of the query (e.g. by parsing and optimizing them) to obtain a query plan with SSF and UDBF operators. In step 386, a processor (such as the processor executing compiler 266) may generate a set of executable query processing steps from the query plan, which may include executable forms of the SSF and UDBF operators based on the program codes for the SSF and UDBF operators. In step 387, the processor may load those steps for execution by a query engine (such as query engine 100).

In step 388, a processor (e.g. the processor operating query engine 100) may execute the query processing steps (e.g. 110) to process data from a data stream. The processor may use cut-rewind processing to execute the query processing steps as a continuous query. The processor may, for example, rewind the processing steps using the rewind function, after the SSF operator (e.g. 300) has signaled a cut condition. After such processing (which may continue for many cut-rewind cycles) the process may be completed in step 389.

Example for Just-In-Time Processing

Stream processing with a continuous query having a cut-rewind mechanism may be used for "just-in-time" data stream records where the records are analyzed with a continuous query before they are stored on disk, for example, in a data warehouse.

Figure 6:
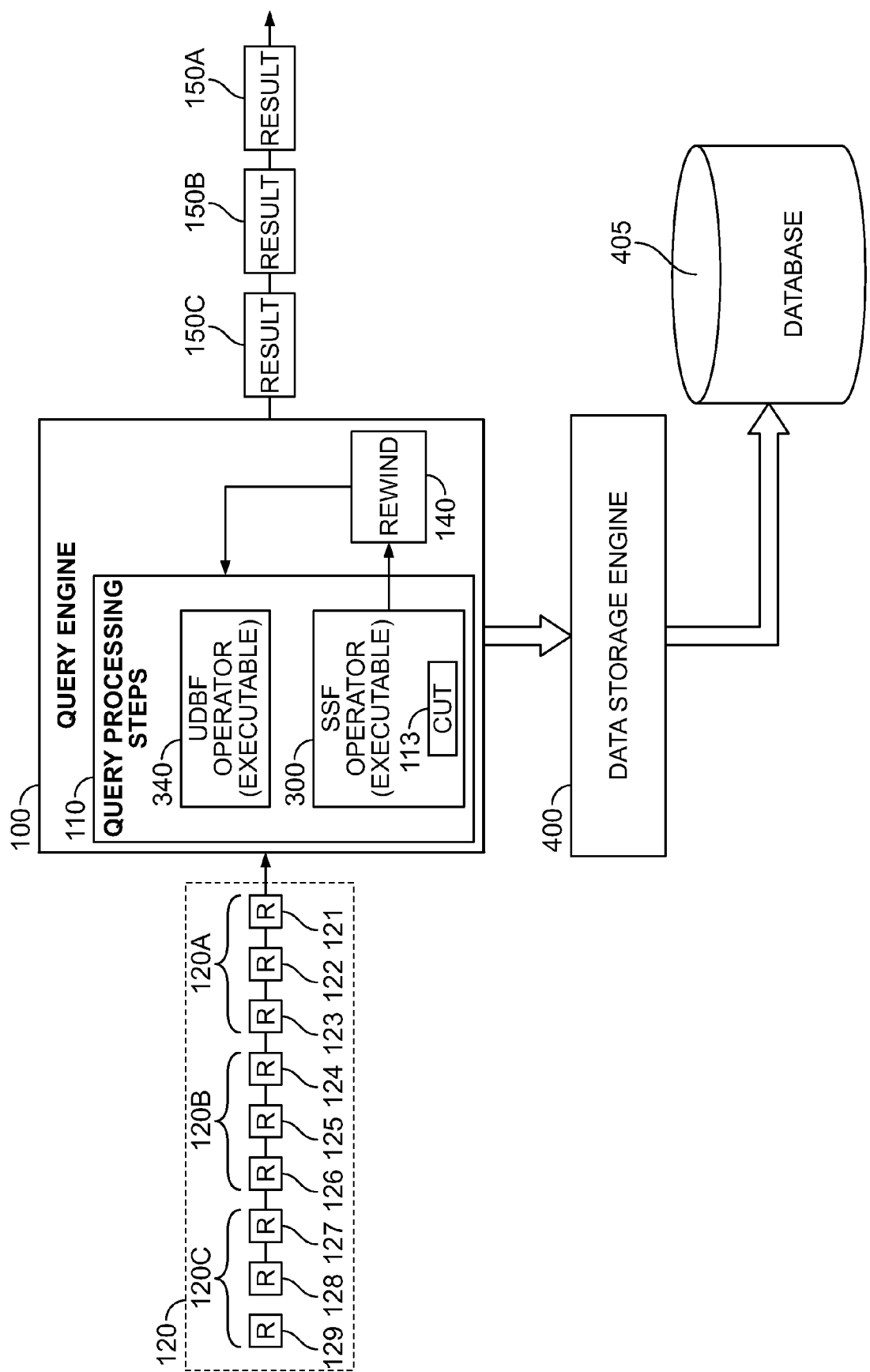
FIG. 6 is a conceptual illustration of a query engine with continuous query processing, integrated with a database engine for "just-in-time" processing, according to embodiments of the invention.

Reference is made to FIG. 6, which is a conceptual illustration of a query engine with continuous query processing, integrated with a data storage engine for "just-in-time" processing, according to embodiments of the invention.

FIG. 6 shows query engine 100 (see FIG. 3 and FIGS. 1A, 1B) executing query processing steps 110 to process records 121-129 of data stream 120. Query engine 100, for example using SSF operator 300 and UDBF operator 340 in query processing steps 110, may process records 121-129 in chunks 120A, 120B, 120C partitioned over a pre-determined time period. In FIG. 6, query engine 100 may be associated with or coupled to data storage engine 400. Data storage engine 400 and query engine 100 may be both part of a relational database management system. Query engine 100 processes each record 121-129 before it forwards the record to data storage engine 400 for storage in database 405. In an alternative embodiment, query engine 100 may also forward records 121-129 to data storage engine 400 in portions or chunks such as portions 120A (containing 121, 122, 123), 120B (containing 124, 125, 126) and 120C (containing 127, 128, 129). Such an integration of data stream processing with database storage may facilitate In-DB stream processing.

In such an embodiment, query engine 100 can comprise software elements executable by any computer or processor having network communication capabilities or that is otherwise capable of providing an interface between query engine 100 and data storage engine 400. In some embodiments, query engine 100 may be coupled to or integrated with (as a part, extension or otherwise of) data storage engine 400.

As one non-limiting example, a computer having a processor such as an HP xw8600 computer with 2× Intel Xeon E54102 2.33 GHz CPUs and 4 GB RAM, running a database engine extended for processing with cut-rewind, may be suitable as a processor executing query engine 100 and data storage engine 400 and may be suitable for processing a large amount of records. However, the invention is not limited to such a configuration and many other processors and/or computers are suitable. The types of computers used in different embodiments may depend upon the number of records to be processed and the time required for processing.

In order to allow the result of a long-running stream query to be incrementally accessible (for example to data storage engine 400), the chunk-by-chunk (portion-by-portion/part-by-part) results of query engine 100 (using cut-rewind) may be "committed", one cycle at a time, in a sequence of "micro-transactions".

Conventionally, a query (non-cut-rewind) may be placed in a "transaction boundary". The actions of processing the query (e.g. executing query processing steps 110 using query engine 100) may be considered a transaction. In such a transaction system, a query result and the possible update effect that may occur to a database may be made visible only after "commitment" of the transaction. A transaction commit then applies the results of all query-based data manipulations concerning the transaction and saves (or persists) the results to the database. If an error occurs during the transaction, or if the user specifies an "un-commit" action, like a rollback operation, the data manipulations within the transaction are not persisted to the database.

With a micro-transaction, transaction boundaries may be set to be consistent with the query cycles. The micro-transaction boundaries may then be synchronized with portion-wise (chunk-wise/part-wise) stream processing. In one embodiment, per-cycle stream processing results may be made visible as soon as the cycle ends. In implementation, an isolation level may be set to allow a cycle to process before it is "committed" (permanently stored in a database). In such an example, a cycle isolation level can be set, such as "Cycle-based Read Committed" (CRC), and the results from each chunk can be read. CRC may follow from the generally known isolation level "Read Commit", which isolates query processing results until they are "committed". In typical database processing, "Read Commit" isolation may mean that it is not possible to read uncommitted intermediate results of the query processing. A CRC isolation level may allow results to be made visible and committed when the cycle ends.

To allow cycle results to be continuously visible to the external world (e.g. client applications), despite the fact that the storage location for results (e.g. the result table) is under the subsequent cycle-based transaction regimen, query engine 100 may enforce record-level locking (e.g. locking each result record after it has been committed).

In addition, the SQL commands SELECT INTO and INSERT INTO may be extended so they may support cycle-based transaction semantics. In one embodiment, an option may be added to force the results and underlying data to stay in memory. An automatic space reclaiming utility may be further provided should the results and underlying data be written to the disk.

In a commonly-available database system, queries that use SQL command operations "Select", "Project" and "Join" (SPJ) may differ in the flow of resulting data from queries that use SQL command operations "Insert", "Delete" and "Update" (IDU). In an SPJ query, for example, the destination of results may be a query receiver connected to the client. In a data update query, such as one using an "Insert", the results may be transmitted (e.g. using an "emitter") to, or synced to, the database.

In stream processing, such separation may be impractical. The analytic results may need to be streamed to the client continuously and also may need to be stored continually for other applications to access. Therefore, in embodiments of the present invention, query engine 100 may permit client output and results persisting for database storage to be integrated and expressed in a single query. Such a "two-receiver"

approach may make it possible to have the results both persisted in the database and streamed out externally at the same time and across cycles.

In such an example, intermediate stream processing results may be deposited into database 405 from a UDF. To do so the UDF may be relaxed from the read-only mode (which may be allowed through an internal setting in the query engines operation parameters) and employ the database system's internal query facility (e.g. parser 262, optimizer 264 compiler 266) to form, parse, plan and execute the queries with the UDF.

Example Map-Reduce Applications

A query processing system providing continuous data stream processing with a cut-rewind process may be suitable in many different data processing configurations. In one example, however a system may be provided in which a query-based application for map-reduce is applied in processing a data stream. Such an application may use a cut-rewind process and apply M-R to the data stream portion-by-portion or chunk-by-chunk over the system's processing cycles (e.g. so that part-by-part a data stream may be processed).

As previously stated, Map-Reduce (M-R) is a programming model that allows large amounts of data to be processed on parallel computer platforms using two basic functions: map and reduce. Data is first mapped (for grouping purposes) using the map function and then reduced (aggregated) using the reduce function.

For example, records having different attributes such as "dog" and "cat" could be mapped, for grouping purposes, to new records (or tuples) where each has attributes of "animal" instead of "dog" or "cat". Then, by a reduce function, all the "animal" records (or tuples) could be aggregated. An M-R model implemented in a parallel processing computer system may enhance the processing of massive quantities of data by a "divide-and-conquer" strategy that may result from dividing the data into portions and processing it on parallel-processing computer installations. However, M-R is not traditionally used for processing unbounded stream data.

Figure 7:
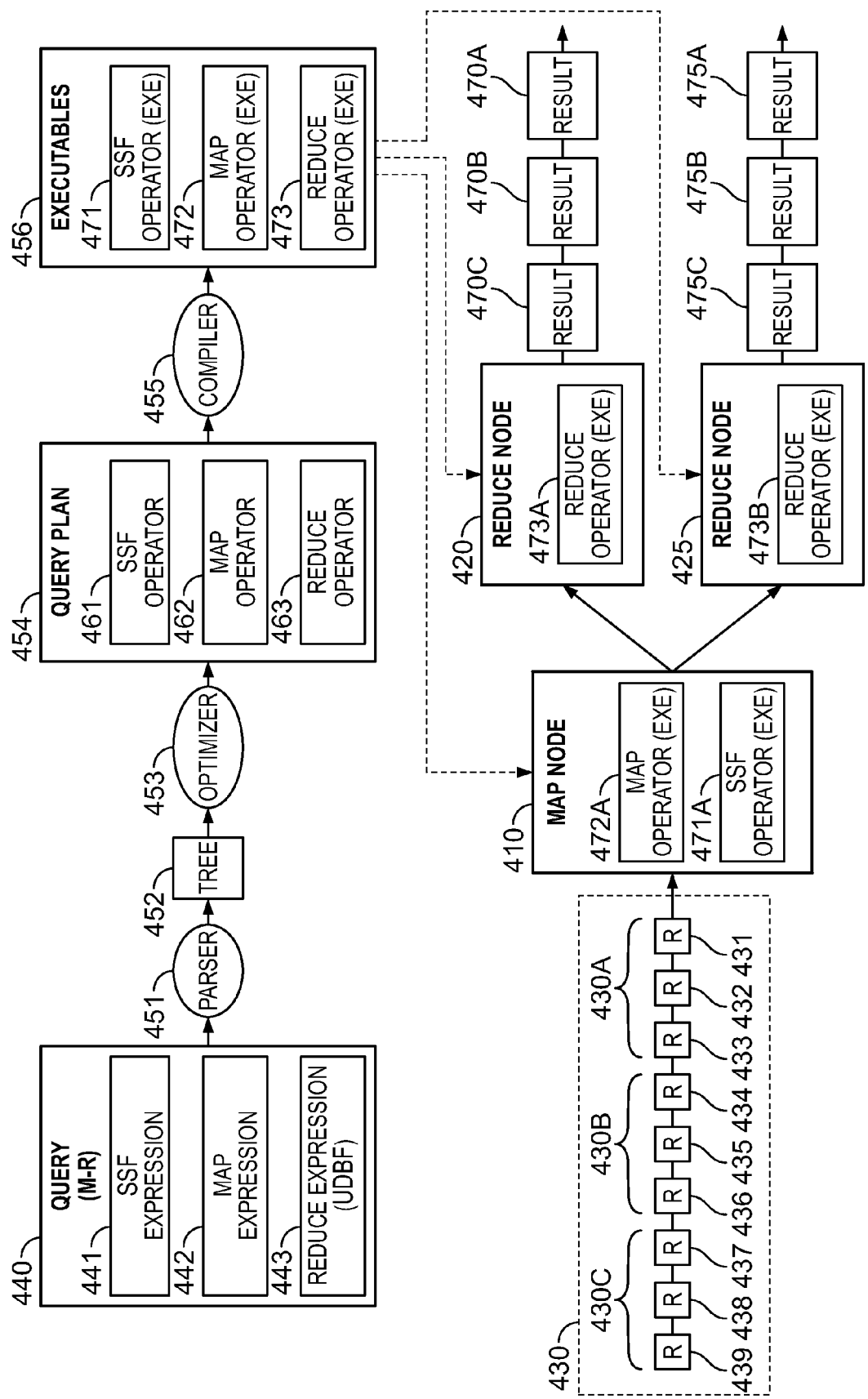
FIG. 7 is a conceptual illustration of a query engine with cut-rewind capability, configured to perform a map-reduce application, according to embodiments of the invention.

Reference is made to FIG. 7, which is a conceptual illustration of a query with cut-rewind (C-R) capability, configured to perform a map-reduce (M-R) application with stream data, according to embodiments of the invention. FIG. 7 shows "map" node 410 and two "reduce" nodes 420, 425. FIG. 7 also shows query 440 to be processed by parser 451, optimizer 453 and compiler 455.

Collectively, nodes 410, 420, 425 may be part of a larger map-reduce processing system having many map and reduce nodes. Map node 410 and reduce nodes 420, 425 may each be included in a parallel-computing platform that include a plurality of processors that are highly-connected. In FIG. 7, map node 410 may be coupled to each of reduce nodes 420, 425 through such connections. Collectively, map node 410 and reduce nodes 420, 425 in this example make up a "query engine" that may perform M-R. Map node 410 may be configured to accept data stream 430 as input. Data stream 430 may include records 431, 432, 433, . . . , 439. Map node 410 and reduce nodes 420, 425 may be configured to analyze records 431-439 using a map-reduce algorithm that has been expressed in query 440.

Query 440 may be written in a structured query language (SQL) that may be compatible with the computer systems used (such as PostgreSQL for a Postgre system). Query 440 may also include expressions for an M-R application that may operate on data stream 430 using a cut-rewind process. Query 440 may include expressions for a map function and a reduce function to perform the M-R. In addition, query 440 may further include expressions for stream data-handling functions, such as an SSF (to capture records from a data stream and signal the occurrence of a cut condition for portion-by-portion processing) and a UDBF (for maintaining history-sensitive data, such as that for a running tally or moving average).

For example, query 440 may incorporate SSF expression 441 for gathering records 431-439 from data stream 430. The function referenced by SSF expression 441 may further include a cut condition procedure. When compiled as an SSF operator (e.g. 300) the function may provide for the SSF operator to process records for a pre-determined time interval, such as one minute. Thus, using SSF expression 441 query 440 may include functionality to retrieve and provide records 431-439 (e.g. tuple-by-tuple) in portioned one-minute portions or "chunks" such as 430A (for records 431-433), 430B (for records 434-436) and 430C (for records 437-439) so that part-by-part data stream 430 may be processed.

Query 440 may also incorporate additional expressions for performing M-R. In different embodiments, map and reduce functions may be specified as functions coded either as "relation valued functions" (RVFs) or SQL statements. As stated above, an RVF is an SQL allowable user-defined function (UDF), which permits a function, either for map or reduce or other computation, to receive tuple set arguments and return a tuple-set in order to carry out computations. In a parallel computing environment, an RVF may further allow relational transformations to occur in the query processing pipeline, which may speed processing. One kind of an RVF is a "table value function", which takes a tuple and returns a tuple set. The map and reduce functions may be referenced in query expressions and included in query 440. For example, a function such as:

map (tuple_value1, tuple_value2, tuple_value3 . . . )

may be a map function that may be coded as a table value function (one kind of RVF). As such, it may receive a tuple (having values: tuple_value1, tuple_value2, tuple_value3 . . . ) and may map the input tuple to one or more new tuples (e.g. converting a "dog" or "cat" tuple to an "animal" tuple for example as described above). Map expression 442 in query 440 may include such a map function in an SQL expression such as:

SELECT map (tuple_value1, tuple_value2, tuple_value3 . . . )

However, other SQL expressions including a map function reference are also possible. In FIG. 7, Map expression 442 references a map function programmed as a table value function. However it is also possible that the map expression 442 references a map function that is other types of UDFs or is created in terms of other programming.

In addition, query 440 may further include reduce expression 443, which may reference a function to perform the reduce of a M-R application. A reduce function may also be coded as an RVF. A reduce function may have a form such as:

reduce (tuple_set)

and may be referenced in query expressions such as query 440. A reduce function may aggregate data or perform calculations such as summing or averaging the data. A reduce function can be referenced in an SQL statement such as:

SELECT reduce (tuple_set) . . .

However, other SQL expressions can be used to reference such a reduce function.

At the point of "reducing" in a map-reduce application, it may be useful to maintain history-sensitive data, such as data for calculating a running tally or moving average, during the processing of a data stream. Accordingly in one embodiment, a storage element, such as a buffer, may be included in the reduce function for maintaining such history-sensitive data. In FIG. 7, Reduce expression 443 (in query 440) may provide a reference to reduce function (such as a RVF or other UDF) that also contains a storage element (buffer), thus making it a UDBF. In such a case, the reduce function may also serve the vehicle for maintaining history-sensitive data, such as running tallies or moving averages. Though in FIG. 7 reduce expression 443 references a reduce function programmed as an RVF, it is also possible that the reduce expression 443 references a function that is programmed as another type of UDFs or is created from other programming allowable with SQL.

Map expression 442 and reduce expression 443 may enable map node 410 and reduce nodes 420, 425 to execute map-reduce processing over a data stream. The map and reduce functions may work cooperatively to produce a result. In terms of relational algebra, a map function may take a set of key-value tuples (k, v) created from the data received and then transform the set of key-value tuples into a set of tuples of a different type (k', v'). The reduce function may then aggregate the v' values with the same k' to produce a result.

For example, if data stream 430 contains, for example, records such as <address, cat>, <address, dog>, <address, no-pet>, a map function may map such tuple pairs to different, possibly more useful pairs for grouping such as <region1, has-pet>, <region1, has-pet>, <region2, no-pet>. The different type tuples (k', v') may have a set of available k' values (e.g. regions: 1, 2, 3, . . . etc.) where each k' may have a corresponding reduce node for gathering tuples having that particular value of k' (region1, region2, region3, . . . etc).

Though only two reduce nodes 420, 425 are shown in FIG. 7, many reduce nodes may be available, e.g. one reduce node for each particular value of k'. For example, records having "region1" k' values may be transferred to one reduce node (e.g. 420), and records having "region2" k' values may be transferred to another reduce node (e.g. 425). Reduce nodes 420, 425 may aggregate the set of values v' with the same k' and each may produce a result. In the example above, the three tuples above can be aggregated to:

<region1, has_pet, 2>
<region2, no_pet, 1>

The set of relationships for map-reduce may be expressed as follows:

Map:$(k,v) \Rightarrow (k',v')^*$

Reduce:$(k',v')^* \Rightarrow (k',v'^*)$ where (k, v) may be mapped to multiple (k', v') values (as indicated by the asterix *) and (k', v')*=>(k', v'*) shows aggregation of the set of values v' having the same k' (to create v'*).

Applied to query-based processing, map and reduce functions may be expressed in query 440. In general, map and reduce functions may be coded as an RVF, UDF or other allowable SQL functions, and the M-R may be the parallel execution of the following SQL "SELECT . . . FROM" statement:

SELECT . . . FROM $f_{reduce}$ ($f_{map}$ ( . . . ));
where $f_{map}$ returns map results, and $f_{reduce}$ reduce takes the results of $f_{map}$ (possibly materialized as a set of "accumulators" (local aggregates)), and provides global aggregation.

Query 440 may be written, for example, in the form of a "SELECT . . . FROM" SQL statement, where $f_{map}$ and $f_{reduce}$ are defined functions.

In an SQL system, the reduce function may be implemented in a number of different ways. In one embodiment, the reduce function may be expressed by standard SQL aggregate functions (such "AVG( )"), or by system-honored (e.g. registered) "user-defined aggregate" (UDA) functions. In such examples, the reduce function, implemented in SQL using a command sequence such as "aggregate-groupby" (first "aggregate" the records then "group" them by a reduce criterion), for example, may be handled by a parallel query engine by its generally known processing.

In a second case, the reduce function may be a user-defined function that is neither an SQL aggregate nor a system-honored UDA. In such a case, the reduce function may be registered as a special "REDUCE" function and the parallel query engine may be extended to support the SQL command "group-by" on such a function.

In FIG. 7, parser 451 and optimizer 453 may, respectively parse and optimize query 440 and create query tree 452 and query plan 454, respectively. Query plan 454 may call for the implementation of query 440 through physical operators. Query plan 454 shows SSF operator 461, which corresponds to SSF expression 441 in query 440. Query plan 454 also shows map operator 462, which corresponds to map expression 442. Reduce operator 463 corresponds to reduce expression 443. Compiler 455 may generate executables 456 from query plan 454, including SSF operator (executable) 471, map operator (executable) 472 and reduce operator (executable) 473.

In a parallel-computer implementation, elements of query plan 454 (as executables) may be distributed to nodes 410, 420, 425 in "sub-query" portions called "fragments". Accordingly, map node 410 may receive sub-queries (fragments) that correspond to the map function. Reduce nodes 420, 425 may receive sub-queries (fragments) that correspond to the reduce function. Each of the "map" sub-queries and "reduce" sub-queries (fragments) may be executed on each of map node 410 and reduce nodes 420, 425.

Nodes 410, 420, 425 may each execute their sub-queries (fragments) in continuous cycles, which after each processing cycle execution at the nodes may be re-wound through a system-wide process. In FIG. 7, map node 410 may receive SSF operator 471A to execute (distributed from SSF operator 471). Map node 410 may also receive map operator 472A (distributed from map operator 472) to execute in performing a map function. Reduce nodes 420, 425 may each receive reduce operator 473A, 473B, respectively (distributed from reduce operator 473).

In processing, map node 410 may receive stream 430, such as a stream of call detail records for processing. SSF operator 471A may have a "cut" condition set for a one-minute interval. Execution of SSF operator 471A by map node 410 may provide data to map operator 472A (tuple-by-tuple) in data "chunks" partitioned on the one-minute interval. Map operator 472A may perform the map analysis (tuple-by-tuple) as the data arrives.

When a "cut" condition is signaled by SSF operator 471A, processing of incoming data at map node 410 may stop. Results of map operator 472A (the results of the (k, v') mapping) are forwarded by k' value to the corresponding reduce node 420, 425. Reduce nodes 420, 425 may each perform aggregation (e.g. globally aggregating for each k' value) on the data each receives and provide a results. For example, node 410 may provide map results from processing portion 430A to each of reduce nodes 420, 425 and those nodes (420, 425) may output results 470A, 475A, respectively. For portions 430B, 430C, reduce nodes 420, 425 may output results 470B, 470C and 475B, 475C, respectively.

During reduce processing, history-sensitive data such as data for moving averages can be stored within the storage elements (e.g. buffers) of reduce operators 473A, 473B (as each may serve as a UDBF). (In alternative embodiments, storage elements (e.g. buffers) also can be included in the map operators or other operators and those other operators also can be used for storing history-sensitive data.) During each cycle, when reduce nodes 420, 425 have completed processing, the sub-queries (fragments) at each of nodes 410, 420, 425 may be rewound and processing in a new cycle can continue.

Rewinding a query is a top-down process along the query plan instance tree (a system tree maintained by the parallel processing system, e.g., at one of the nodes, as the nodes execute the query processing steps). In rewinding, specific treatment may be provided depending on each operator type listed in the instance tree. For example, rewinding a "join" operation may have different requirements than rewinding an "aggregate" operation. A parallel processing computer system, may have an API for specifying "rewinds" for specific operators. In one embodiment, the rewind of the instance tree, maintains (and does not delete) the storage elements (e.g. buffers) accessed and updated by the UDBFs in the execution of the query.

Example Implementation with Multiple Map Nodes

Figure 8:
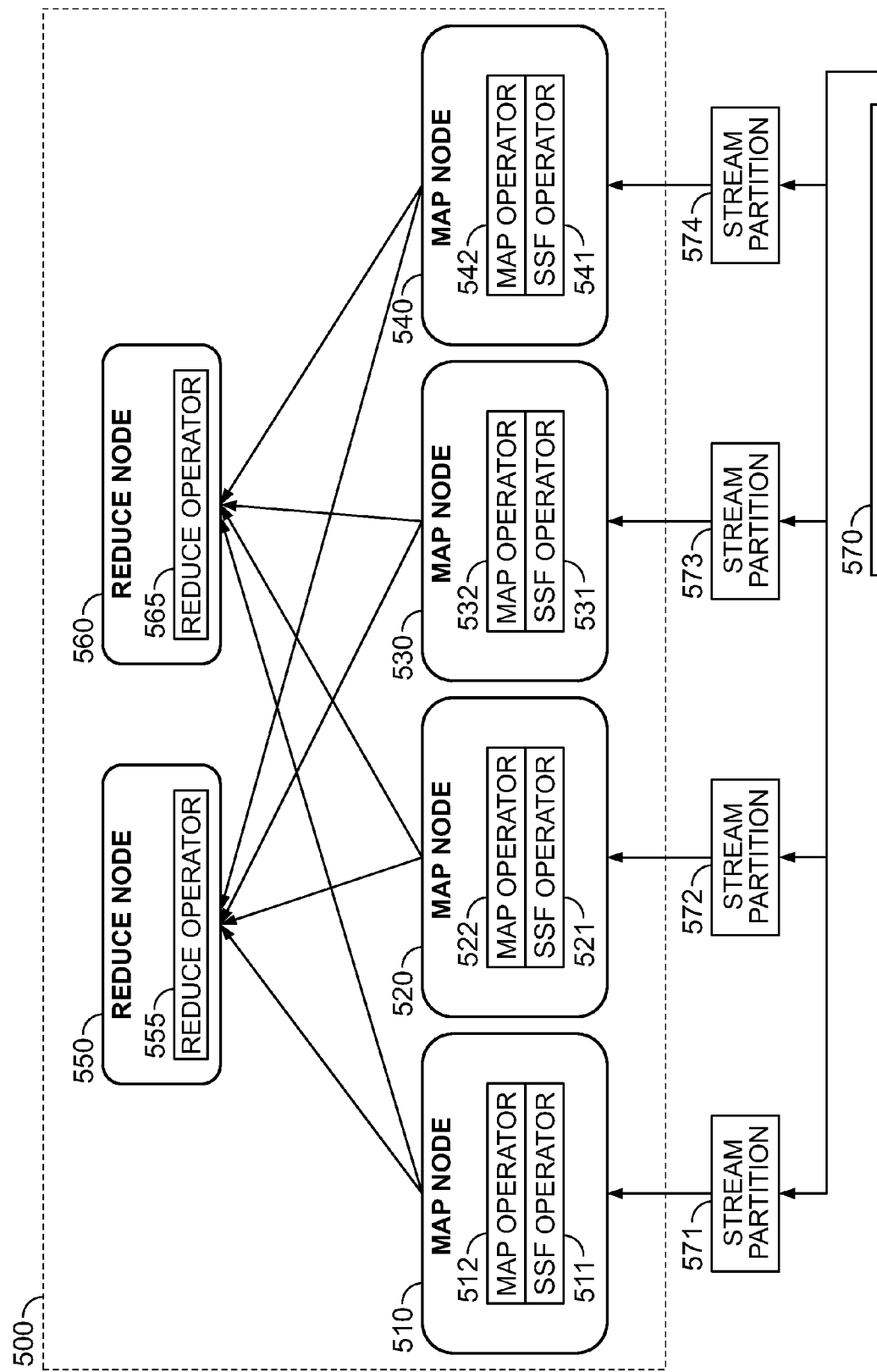
FIG. 8 is a conceptual illustration of a larger-scale map-reduce application using nodes with cut-rewind functionality, according to embodiments of the invention.

As the map-reduce (M-R) model can be applied to large amounts of data using many parallel-processing computers, a larger map-reduce (M-R) implementation can be shown. Reference is made to FIG. 8, which is a conceptual illustration of a larger-scale map-reduce application using nodes with cut-rewind functionality, according to embodiments of the invention.

FIG. 8 shows map nodes 510, 520, 530, 540, where each may be connected to and able to communicate with reduce nodes 550, 560. Map nodes 510, 520, 530, 540 and reduce nodes 550, 560 may each be nodes (e.g. processors) in a parallel processing computer system 500 (which may be considered a query engine). Map nodes 510, 520, 530, 540 and reduce nodes 550, 560 each may be configured to execute sub-queries (fragments) of an M-R query, capable defined for cut-rewind functionality.

Stream source function (SSF) operators 511, 521, 531, 541 may each be distributed to one of map nodes 510, 520, 530, 540, respectively. SSF operators 511, 521, 531, 541 may be distributed to gather record data from data stream 570 and provide it for mapping. Map operators 512, 522, 532, 542, respectively, also may be distributed to map nodes 510, 520, 530, 540 to execute an M-R map function. Each map node 510, 520, 530, 540 may execute the map function (using map operators 512, 522, 532, 542, respectively) and transmit the results of the map operation to each of reduce nodes 550, 560 as appropriate based on the data. Reduce operators 555, 565, respectively, may have been distributed to each of reduce nodes 550, 560 to perform an M-R reduce function.

Data stream 570 may be any kind of record stream such as a stream of call detail records from a telecommunications system, a stream of user mouse click records from a "click" stream processing system or a stream of trade execution records from a stock trading system.

In FIG. 8, data stream 570 has been partitioned over map nodes 510, 520, 530, 540 prior to the data being processed by each node. The partitioning of data stream 570 results in the formation of stream partitions 571, 572, 573, 574 (each a data stream). SSF operators 511, 521, 531, 541 each may be set to execute a "cut" condition based on reading the data received (e.g. records from stream partitions 571, 572, 573, 574), respectively.

In this example, the query engine (500) may be distributing data globally according to a first portioning scheme (such as partitioning the data stream into stream partitions 571-574 for even distribution of records between nodes) and processing the data at each node 510, 520, 530, 540 according to a second portioning mechanism (such as the time-based partitioning scheme signaled by the occurrence of the cut condition). In exemplary implementations, one requirement may be that if the "cut" condition is set based on a time interval (such as processing for a minute and then "cutting" or halting the data processing), then data stream 570 cannot be globally partitioned (e.g., into stream partitions 571, 572, 573, 574) based on time. In such an example, partitioning of data stream 570 must be performed based on some other criterion, such as even distribution of records to the nodes.

In processing, an M-R query with cut-rewind mechanism (e.g. written in SQL) is parsed and optimized into a query plan that may be a tree of operators (see, e.g. FIG. 3). A compiler may generate executables (see FIGS. 3, 7). Sub-queries (fragments) pertaining to the map function (including SSFs 511, 521, 531, 541 and map operators 512, 522, 532, 542, respectively) may be distributed to each of the map nodes 510, 520, 530, 540. Sub-queries (fragments) pertaining to the reduce function (including reduce operators 555, 565) may be distributed to each of the reduce nodes 550, 560. In cut-rewind, the executions of all of the nodes 510-560 may be rewound, and the storage elements (e.g. buffers) of any UDBF executed at a node may be preserved.

Processing between the multiple map nodes 510, 520, 530, 540 and multiple reduce nodes 550, 560 may be synchronized and may be performed according to cycles, to facilitate cooperative processing between nodes. The chunk-wise M-R can be supported by means of the cycle-based continuous query under the C-R mechanism.

In parallel execution such as in FIG. 8, the "cut" condition is identical in map nodes 510, 520, 530, 540. A copy of the same SSF operator and same map operator may have been distributed to each of map nodes 510, 520, 530, 540, for example. The "cut" condition may be used to synchronize their operations, such that map nodes 510, 520, 530, 540 may process together following the same cycle periods.

At any map node 510, 520, 530, 540, the "cut" condition may be met by checking the incoming data. When the cut condition is met the SSF operator at that node (e.g. 511, 521, 531, 541) may signal "end-of-data." An SSF operator may signal end-of-data to the processor of the node for example, through setting a flag (e.g. on a function call handle).

In one embodiment, if the cut condition is detected in an SSF operator (e.g. 511) by testing a newly received stream element, the "end-of-data" event of the current cycle may be captured upon receipt of the first tuple of the next cycle. In such a case that tuple may not be returned by the SSF operator in the current cycle. Instead, the tuple may be buffered within the SSF operator and returned as the first tuple of the next cycle. Since the query instance is kept alive, a tuple can be kept across the cycle boundary (such as by having a storage element (e.g. buffer) in the SSF operator).

A query execution cycle may end after "end-of-data" (the "cut" condition) is signaled from all data sources. With such synchronization, all the partitioned streams are processed together until "cut". Because the cut condition is the same across all nodes 510, 520, 530, 540, and the nodes wait for each other to signal a "cut", the cycle-based query executions of nodes 510, 520, 530, 540 may be synchronized throughout the data processing.

When SSF operators 511, 521, 531, 541 on all map nodes 510, 520, 530, 540 have signaled "end-of-data," the map phase of the current query cycle may be completed. The chunk-wise map results in map nodes 510, 520, 530, 540 may then be shuffled to reduce nodes 550, 560. Reduce nodes 550, 560 may execute the reduce function (using reduce operators 555, 565) on the data each has received. Upon the completion of reduce function execution, the current query cycle may be ended by the query engine (500). After that, the query processing steps may be rewound through all of the nodes 510, 520, 530, 540, 550 and 560.

At the end of query cycle execution, the memory allocated to the query execution instance is re-instantiated (reset) (in a parallel computing environment memory is shared). However, at the end of each cycle, elements of the application state, such as processing buffers formed by any UDBFs, may be preserved. The preservation of such buffers allows for computations such as running totals, sliding scales and other history-based computation. In general, the intermediate results of standard SQL operators (associated with the current chunk of data) may be discarded, but the application contexts kept in the UDBFs (e.g. for handling sliding windows) are retained. In rewinding, the query overall will not be re-parsed, re-planned or re-initiated.

In embodiments of the invention, rewinding the query plan instance aims to process the next chunk of data, rather than aiming to re-deliver the current query result. Therefore, rewinding, in embodiments of the invention, may be different from "rewinding a query cursor" for re-delivering a result set.

For example, conventional cursor rewind may keep hash-tables for a hash-join in operation. In contrast, rewinding in embodiments of the invention may allow for such hash-tables discarded since they were built for the last chunk that was processed. In stream processing, the rewind may be made to process the next chunk, not the same chunk over again.

As mentioned above, the cut-rewind approach may provide the ability to keep the continuity of the query instance over the entire stream while dividing it to a sequence of execution cycles. This may be significant in supporting history-sensitive stream analytic operations. Further, with the original M-R model, data can be seen to be partitioned "horizontally" over cluster nodes for parallel computation. The cut-rewind mechanism, applied in this example to M-R, may allow an M-R application to run cycle by cycle, hence scale out (or be able to be applied again and again) "vertically" over infinite data streams.

Further, if an additional middleware layer were introduced for performing an M-R query iteratively on the data chunks, several kinds of performance penalty may be incurred, including the overhead of repeated query setup/teardown and static data loading, as well as the extra cost of data copying and moving between the query engine and the middleware. A middleware layer may also cause loss of continuity in tracking the application context, e.g. the data cached in the UDF closures, which may be required for history-sensitive operations such as the moving average calculation. Performing M-R with a query having a C-R mechanism may solve such problems.

Example M-R Example on Parallel-Processing Platform

Figure 9:
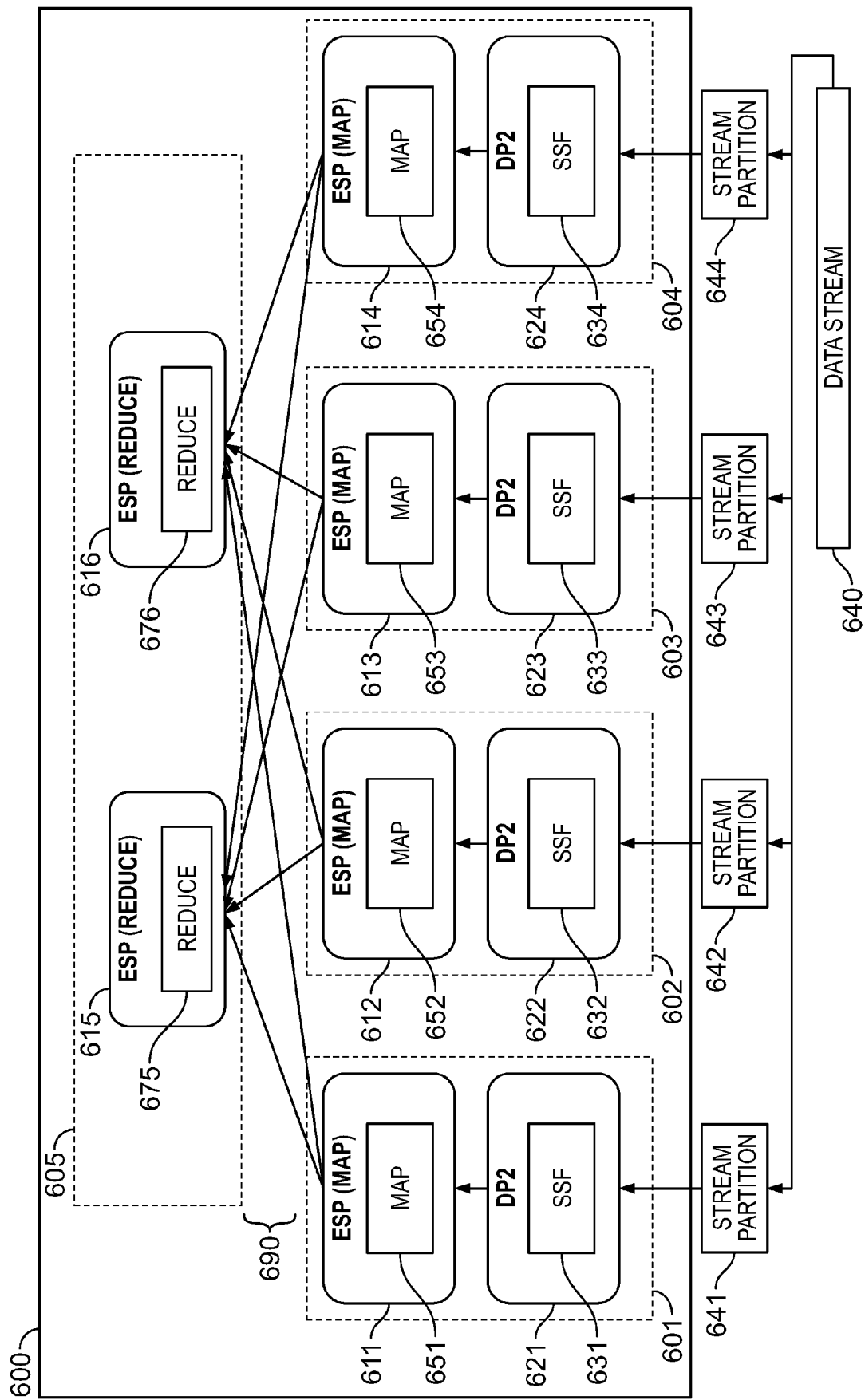
FIG. 9 is a conceptual illustration of a map-reduce application implemented on a multi-node database engine using a cut-rewind mechanism, according to embodiments of the invention.

In different embodiments, different computer hardware configurations can be used for creating a map-reduce application using a cut-rewind procedure for continuous query execution in processing a data stream. Reference is now made to FIG. 9, which is a conceptual illustration of a map-reduce application implemented on a multi-node database engine, such as a HP Neoview.

A parallel database engine 600, such as an HP Neoview, may be built on a cluster of interconnected server nodes 601, 602, 603, 604, 605. (In FIG. 9 only 5 nodes are shown. However, an HP Neoview platform may be configured in combinations of for example 16, 32, 48, 64, 96, 128 and 256 nodes). Each node 601-605 may include a processor (such as an Intel Itanium processor) executing one or more query processing servers (software processing engines), which may be either "query executors" (executor server processes (ESPs)) 611, 612, 613, 614, 615, 616 or "data processors" (e.g. database server engines known as "DP2s") 612, 622, 623, 624. In non-stream processing situations, DP2s, for example, 621-624, may be responsible for retrieving data from a database, as well as for some localized query processing. Generally also, ESPs, for example 611-616 cooperatively carry out parallel query processing by exchanging and merging partial results.

In an embodiment to provide query-based M-R processing with cut-rewind, map functions may be executed by a DP2 or an ESP (e.g. 621-624 for DP2s or 611-614 for ESPs). SSF operators 631, 632, 633, 634 may be distributed to DP2s 621, 622, 623, 624, respectively, for gathering data (e.g. records) from the stream partitions 641, 642, 643, 644, respectively, that are provided from data stream 640. Further, map operators 651, 652, 653, 654 may be distributed to ESPs 611, 612, 613, 614 to execute the map function on the gathered data.

In one embodiment, "SSF scan" (the operation of each SSF operator 631, 632, 633, 634) may be supported at both the SSF level and the query executor level (e.g. the upper-level functions and routines that access the SSF to get data). In one example implementation of such functionality, a data structure containing function call, for example, "hFC" may bridge these two levels. "hFC" may be initiated by the query executor (the process running the query steps at the node) and the hFC data structure may be passed in/out the SSF operator for exchanging function invocation-related information. Such a mechanism may be used for minimizing the code change, but maximizing the extensibility of the query engine.

In the example of FIG. 9, reduce operators 675, 676 may be executed by ESPs 615, 616. Re-grouping the map function results (from "map" ESPs 611-614) to perform the reduce function (at reduce ESPs 615, 616) may be made through the transfers each map nodes 601-604 make to transfer data to the reduce nodes (e.g. 615, 616). In FIG. 9, node 605 is operating both "reduce" ESPs 615, 616. Such transfers act to re-partition the data (which are indicated by the transfer lines 690 in FIG. 9.

Data Stream Processing Example

A system incorporating a query with cut-rewind mechanism may be used to analyze many different kinds of stream data, such as call data in telecommunications systems, stock data in stock trading systems, "click" data in click stream monitoring system and other stream data in many other systems. In one example, an M-R application may be implemented, using cut-rewind, to provide vehicle exhaust analysis.

In such an example, sensors, such as infrared absorption analyzers, may measure the concentration of CO (carbon monoxide), $CO_2$ (carbon dioxide), H—C (Hydrocarbon) and NO (Nitric Oxide) in the exhaust emissions of monitored vehicles. The system measures average emissions every minute. The system may report, in every minute and in each monitored district, both:
 (1) An average emission value; and
 (2) The moving average from the past 10 minutes Exhaust emission may be measured in "ppm" (parts per million), convertible to percentage. The readings of the sensors may provide input data for the example system.

For this embodiment, which takes into account continuous readings (a data stream) rather than a snapshot of readings (data from a table), it may be assumed each vehicle may be equipped with a GPS (Global Positioning System) for positioning the vehicle's (x, y) location and the urban district it is in, as well as an infrared absorption analyzer for measuring the concentration of CO, $CO_2$, H—C and NO in its exhaust emission. Instead of data being stored in a table, in this example data comes in the form of a stream. The position and emission of each car may be read every 30 seconds (0.5 minute). Each reading in such a system may constitute an "event" with attributes:
 i) vid (vehicle identification number);
 ii) time (in seconds);
 iii) (x, y) (GPS-provided x, y position of the vehicle); and
 iv) Emission data
  (emission rates for CO, $CO_2$, H—C and NO in parts-per-minute (ppm))

An SSF, for example "SSF_exhausts(time-window, cycles)", may read incoming data (events) and generate data tuples with timestamps. In such an example, "time-window" may be a numeric value specified in minutes and "cycles" may be a numeric value specifying the number of cycles the query is supposed to run. For example, "SSF_exhausts(1, 180)" may deliver tuples falling in an execution cycle of one (1) minute. Processing may continue for 180 cycles (3 hours). Setting the parameter "cycles" to 0 may allow the query to run infinite cycles.

In addition to gathering data, the system may also execute a map-reduce function to analyze the data. In such a system, an average emission value for each district may be computed along with a moving average from the past 10 minutes.

To provide data for such an average emission calculation, a map function may determine a composite exhaust emission measure for each vehicle based on data found in an input record. The map function may determine this composite emission measure by comparing the CO, $CO_2$, H—C and NO values read in an input record against values kept in a static table. Thus, a record (tuple), collected by the SSF having attributes, such as:
 <vid, time, (x, y), CO, $CO_2$, H—C, NO . . . >
may be mapped to a tuple such as:
 <minute, district, comp_emission>

The function "comp_exhaust" may perform this map function. It may have a function signature such as:
 comp_exhaust(CO, $CO_2$, HC, NO, comp_rule_table)
where "comp_exhaust( )" is the function name, "CO", "$CO_2$", "HC" and "NO" are the data values from a stream record input to the function and "comp_rule_table" may be a pointer to the comparison table. The function, when called, may return a map tuple, such as "<minute, district, comp_emission>" for the vehicle. "comp_exhaust( )" in this example may be created as a relational value function (RVF), for example, in the form of a "table value function". However, in other embodiments other types of UDFs may be used or other SQL statements may be used.

The map-reduce application may also include a reduce function. In this example, in which the system reports every minute both an average and a moving average for each district, there may be two reduce functions. In such an embodiment, a first reduce function may be provided by the standard SQL aggregation function "AVG( )". Such a function may be used for deriving the per-minute composite exhaust emission measures. For this reduce, "AVG( )" can be applied to the tuple "<minute, district, comp_emission>" to get the per minute composite emissions by, for example, averaging the "comp_emission" value by "district". A tuple from this reduce may have attributes such as:
 <district, minute, avg_emission>

The second reduce function computes the past 10-minute moving average of each of the average measures. Although the query execution cycle in this example is based on a one-minute time window, it is possible to buffer the past 10 minutes of measurements and use that storage element (e.g. buffer) to derive their moving average. This is because a query process with cut-rewind is cyclically rewound but not shut-down. Using cut-rewind, data stored in user-defined buffer function (UDBF) storage elements can be maintained across query cycles. In the present example, a UDBF such as
 exhaust_moving_avg(district, minute, avg_emission)
may receive the data from a computed "<district, minute, avg_emission>" tuple and may store that data in a storage element (e.g. buffer) within that function. "exhaust_moving_avg( )" may also compute a moving average value, based on this newly received average value and past stored values.

One full query which incorporates "SSF_exhausts( )" (the SSF function), "comp_exhaust( )" (the map function (e.g. an RVF, table value function)), "AVG( )" (a reduce function) and "exhaust_moving_avg( )" (e.g. a reduce function incorporating a UDF buffer) may have the following form in SQL:

```
SELECT p.minute, p.district,
    exhaust_moving_avg(p.district, p.minute, p.avg_emission)
    AS past_10m_avg_emission
FROM(
    SELECT s.minute AS minute, s.district AS district,
    AVG(s.emission) AS avg_emission
    FROM (
        SELECT FLOOR(time/60)::integer AS minute, district,
            comp_exhaust(CO_ppm, CO2_ppm, HC_ppm,
            NO_ppm,
            SELECT * FROM comp_rules') AS emission
        FROM SSF_exhausts (1, 0)) s
    GROUP BY minute, district ) p;
```

In this example, the query above is repeatedly applied to the data chunks falling in one-minute time-windows, and rewinds up to infinite times. It is a truly continuous query. As can be seen in the query and as shown above, the composite exhaust is calculated by the RVF (e.g. table value function) "comp_exhaust( )" based on the dynamic readings and the static relation "comp_rules".

It can also be seen from the query above that the sub-query with alias "s" calculates the emissions from the readings, and the sub-query with alias "p" yields the average emissions for every minute and in every district. Overall, in this example, the SQL aggregate function ("AVG( )") is computed cycle-by-cycle with no context carried over from one cycle to the next.

The dimensioned moving average in the past 10 minutes may be calculated by the UDBF "exhaust_moving_avg( )". This function buffers the past per-minute average for accumulating the 10-minute moving average. Since the query processing is only rewound but not shut down, the storage element (e.g. buffer) sustains continuously across query cycles. This may show one advantage of cut-rewind for query processing over shutdown/restart.

Figure 10:
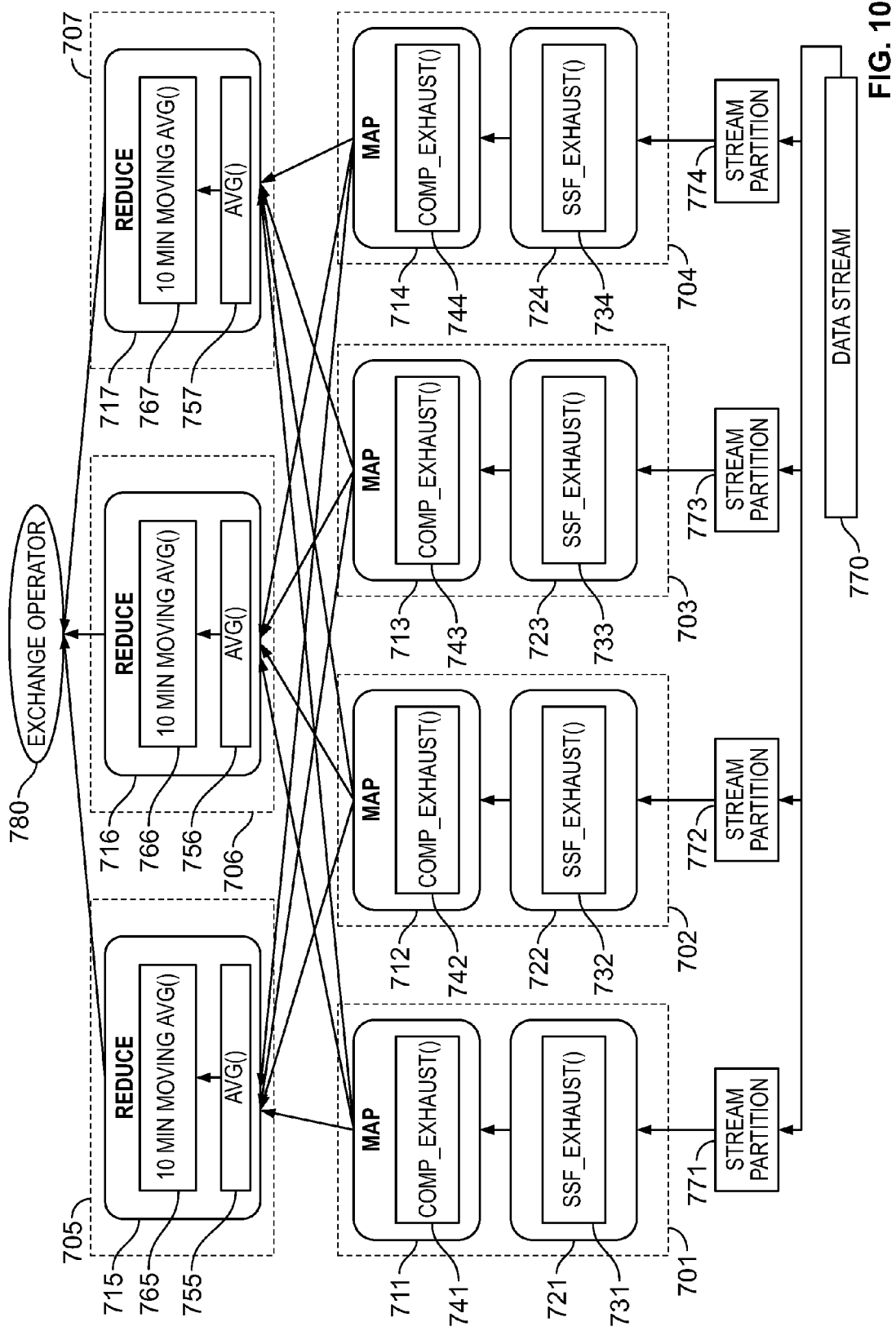
FIG. 10 is a conceptual illustration of a map-reduce application for data stream analysis of exhaust data, according to embodiments of the present invention.

Reference is now made to FIG. 10, which is a conceptual illustration of a map-reduce application for data stream analysis of exhaust data, according to embodiments of the present invention.

FIG. 10 shows map nodes 701, 702, 703, 704 and reduce nodes 705, 706, 707. Map nodes 701, 702, 703, 704 each may include a query executor (ESPs 711, 712, 713, 714) and a data processor (DP2s 721, 722, 723, 724). Reduce nodes 705, 706, 707 may include query executors (ESPs 715, 716, 717).

Map nodes 701, 702, 703, 704 may be provided with elements to perform the map functions. For example, sub-queries (fragments) that include SSF_exhaust( ) 731, 732, 733, 734 (in executable form) may be distributed to DP2s 721, 722, 723, 724, respectively. Sub-queries (fragments) that include comp_exhaust( ) 741, 742, 743, 744 (in executable form) may be distributed to ESPs 711, 712, 713, 714. SSF_exhaust( ) 731, 732, 733, 734 may be a stream source function (SSF) that may allow stream data to be read up the occurrence of a cut condition. comp_exhaust( ) 741, 742, 743, 744 may be an RVF (e.g. table value function) that allows the map function (computing a composite exhaust emission measure for each vehicle) to occur.

Reduce nodes 705, 706, 707 may be provided with elements to perform the reduce functions. For example, sub-queries (fragments) that include AVG( ) 755, 756, 757 (in executable form) and exhaust_moving_avg( ) 765, 766, 767 (in executable form) may have been distributed to ESPs 715, 716, 717. AVG( ) 755, 756, 757 may be an SQL operator to provide the by-minute emission average for each district. "exhaust_moving_avg( )" 765, 766, 767 may be a UDBF (e.g. with a buffer) for storing past emission averages for computing 10-minute moving averages.

Data stream 770 (the vehicle emission stream) may be read in a real-time mode where the data may be received from a data driver outside of the query engine with real-time intervals. For parallel processing, data stream 770 may be hash-partitioned by vid (vehicle identification number) to map nodes 701, 702, 703, 704 in stream partitions 771, 772, 773, 774, respectively.

The query processing steps run cycle-by-cycle on the parallel database, each cycle processing data falling in a one-minute time window. Since the "cut" condition is identical over all the data partitions, the cut condition may provide "sync-points" (a common cut point, or common cycle condition) for overall chunk-wise query evaluation. Shuffling the map results for parallel reducing is handled by the parallel database engine, for example, following standard parallel query processing.

In each cycle, the query processing steps may be executed in the following way. Map nodes 701, 702, 703, 704 may invoke "SSF_exhaust( )" 731, 732, 733, 734 multiple times in each query execution cycle. Each call may return one tuple to fuel the query. Nodes executing "SSF_exhaust( )" 731, 732, 733, 734 each may signal "end-of-data" upon the change of minute, for example where the passing of a one minute interval is the "cut" condition.

Map function "comp_exhaust( )" 741, 742, 743, 744 may be executed in parallel, and each node executing that function may derive a composite exhaust emission measure for each input tuple, based, for example, on a static relation "comp_rules". In different embodiments, this static relation ("comp_rules") may be loaded only once initially for processing all the tuples in a cycle, and this loading can be sustained over all the cycles due to the long-standing nature of the query instance. A performance gain may result from eliminating repeated loading of static data, which may be useful in processing infinite stream data.

In this example, there may be a two-level reduce operation. One reduce may be conducted by the standard SQL aggregation function "AVG( )" 755, 756, 757. AVG( ) may derive the per-minute average composite exhaust emission measures for each district. "exhaust_moving_avg( )" 765, 766, 767 may further derive the moving average for the past 10 minutes from the minute-average measures. Although the query execution cycle is based on a one-minute time window, it is possible to buffer the past 10-minute measures for deriving their moving average, because the query instance is cyclic (rewound but never shutdown). The data buffered with the UDF ("exhaust_moving_avg( )", a UDBF, 765, 766, 767) can retain across query cycles in such an "ever-green" query instance.

When all the map sites reach end-of-data, the whole query enters the end-of-data status. Upon the completion of the current execution cycle, the query is rewound and then the next execution cycle proceeds. In this way the M-R computation is executed cycle-by-cycle. Results after each cycle are collected by an exchange operator 780 and may be committed (e.g. saved as a completed transaction in a transactional system) and transmitted for use in other applications (client applications).

Figure 11:
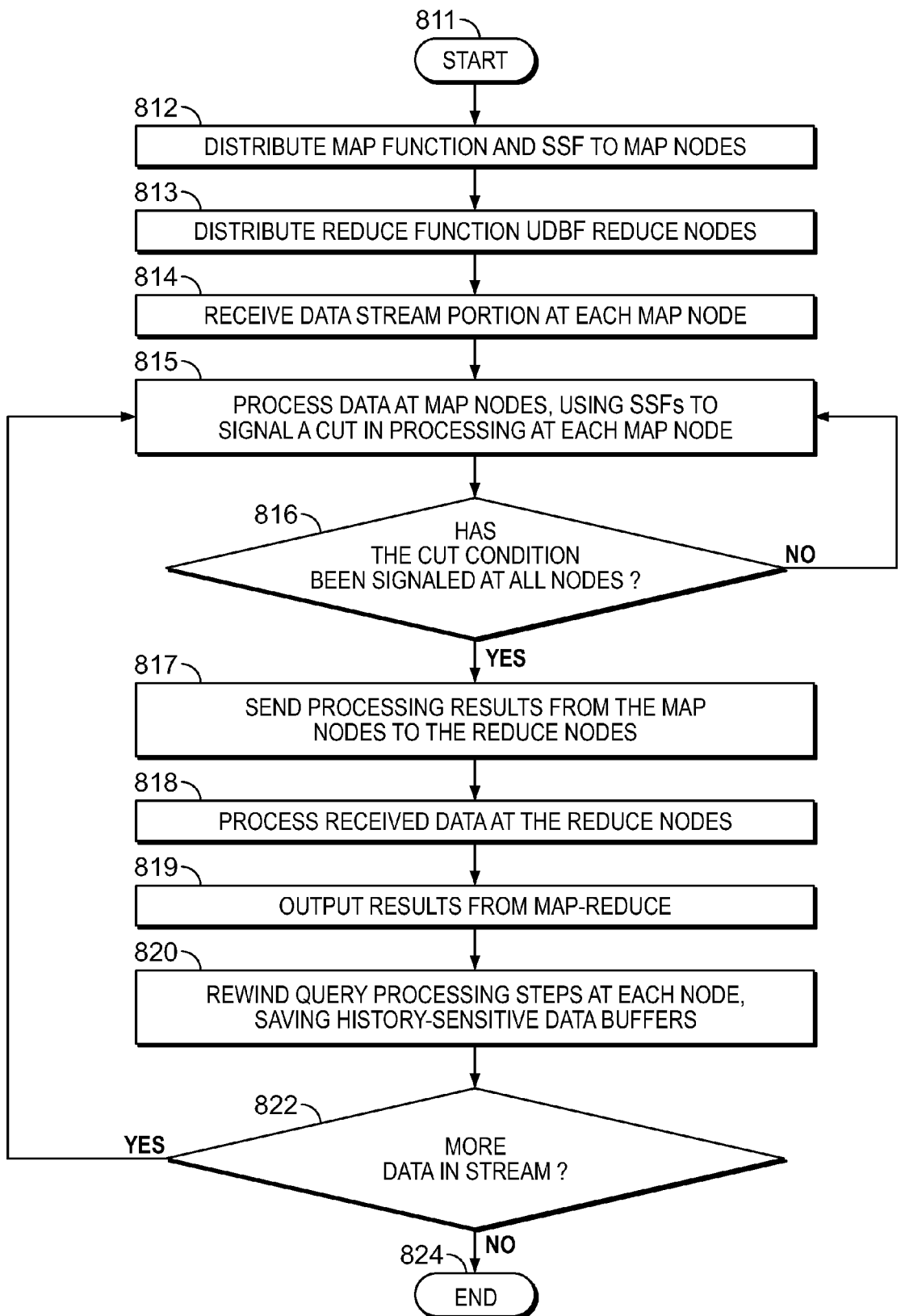
FIG. 11 is a schematic flowchart of a process for map-reduce processing of a data stream using cut-rewind.

Reference is now made to FIG. 11, which is a schematic flowchart for map-reduce processing of a data stream using cut-rewind. The process begins in step 811 and, in step 812 a processor (such one of the nodes 701-707, acting as a "lead" processing node) may distribute a map function and a stream source function (SSF) (comprising programming to read stream data and determine the occurrence of a cut condition) to a first plurality of nodes (map nodes) in a networked computer system. In step 813, the processor may further distribute a reduce function (comprising a storage element such as a buffer) for maintaining history-sensitive data) to a second plurality of nodes (reduce nodes) in the networked computer system.

In step 814, the processors at each of the first nodes (map nodes) each receive a stream partition comprising, for example, records. The partitioning of the data stream into stream partitions may be based, for example on a hash partitioning function (which seeks to maintain even distribution of stream data to each of the map nodes). In step 815, processors may begin to process the records. The processing may follow a cycle. In step 815, the processors at each map node, using for example the SSF operator, may read records from their received portion and process them until a cut condition is reached at the node. The processors at each map node may have the same cut condition, but in processing data, each processor may signal the cut condition at a different time.

In step 816, a controlling processor (e.g. the node that is executing the query as the lead node), may determine if the cut condition has been signaled by each of the map nodes. The processors at each of the map nodes may signal that a cut condition has occurred, for example, by sending an "end-of-data" signal. If, in step 816, the controlling processor determines that one or more of the map nodes have not signaled "end-of-data," the processor may return to step 815 and monitor the map nodes further processing.

If in step 816 the controlling processor has determined that a cut condition (e.g. end-of-data) has been signaled from all of the map nodes, the processor then proceeds to step 817. Here, the results from each map node may be shuffled and sent for processing to the appropriate reduce nodes. Each of the map nodes may generate different results, which may be sent to different reduce nodes (e.g. according to the map-reduce processes described above). In step 818, processors at the reduce nodes may process the received map node results (aggregating the results) to generate, in step 819, a map-reduce output.

In step 820, the controlling processor may then rewind the query processing steps through each node where processing took place. In rewinding, history-sensitive data maintained in UDBF storage elements (e.g. buffers), kept as part of the application context may be saved. After rewinding, the map and reduce nodes are ready for a new processing cycle.

In step 822, the processors of the map nodes check to determine if there is more stream data to process. For each map node, if there is more data at the node, the processor may return to steps 815-822 to process another time-stamped "chunk" from that portion. Data processing may continue cycle-by-cycle, continuously. When all the data has been processed (which may not happen for a data stream), or a termination signal is receive, processing is completed in step 824.

Example Semantics

In terms of relational algebra, the semantics for a C-R mechanism for processing by a continuous query (CQ) may be provided as follows.

Assume it is given there exists a query Q over a set of relations $R_1, \ldots, R_n$ and an infinite stream of relation tuples S with a criterion C for dividing S into an unbounded sequence of chunks, e.g. by every one-minute time window. If that is true, then a set of portions or chunks can exist, such as:

$$<S_{C0}, S_{C1}, \ldots, S_{Ci}, \ldots>$$

where $S_{Ci}$ denotes the i-th "chunk" of the stream according to the chunking-criterion C. (It is also possible that $S_{Ci}$ can be interpreted as a relation.). Applying query Q to unbounded stream S over the bounded relations $R_1, \ldots, R_n$ provides:

$$Q(S, R_1, \ldots, R_n) \rightarrow <Q(S_{C0}, R_1, \ldots, R_n), \ldots Q(S_{Ci}, R_1, \ldots, R_n), \ldots>$$

Such a relation continuously generates an unbounded sequence of query results, one on each chunk of the stream data.

Embodiments of the invention may support the above semantics by using a continuous query that runs cycle-by-cycle for processing the stream data chunks, each data chunk to be processed in each cycle, in a single, long-standing query instance.

It may also be possible to refer to the data chunking criterion (criterion C above) as the "query cycle specification." The cycle specification may be based on time or a number of tuples, which can amount to as small as a single tuple, and as large as billions of tuples per cycle.

The stream query may be terminated based on specification in the query (e.g. run for 300 cycles), user intervention, or a special end-of-stream signal received from the stream source. Such a model may allow for any possible SQL expression to be applied on each data chunk without limit. The output may be a stream consisting of a sequence of chunks, with each chunk representing the query result of one execution cycle. While there may be different ways to implement such a model, the approach is to generalize the SQL engine to include support for stream sources. The approach may enable queries over both static and streaming data, and may retain full SQL power, while executing stream queries efficiently.

Compared with alternative systems which may schedule multiple queries/operations performed by a workflow-like system outside the query engine (which may be used in some stream processing management and also in some extended M-R systems), the benefits gained by a cut-rewind approach include the use of full SQL querying and chunk-wise processing with history-sensitivity. Further, there may be reduced overhead for setup and teardown of queries, for loading static data repeatedly, and for IPC (inter-process communication) or even ODBC (open database connectivity)-oriented data copying/moving.

Additional Considerations

Some embodiments of the invention may be implemented, for example, using a machine-readable medium or article which may store an instruction or a set of instructions that, if executed by a machine, cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, e.g., memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, target code, compiled code, interpreted code, executable code, static code, dynamic code, or the like, and may be implemented using any suitable high-level, low-level, object-oriented, visual, compiled and/or interpreted programming or query language, e.g., SQL, (such as that run by servers like Oracle, Microsoft SQL server, IBM DB2, Sybase, MySQL, PostgreSQL, Teradata, Infomix, Ingres) and programming languages like C, C++, Java, BASIC, Pascal, Fortran, COBOL, assembly language, machine code, or the like.

Embodiments of the invention may include apparatuses for performing the operations herein. These apparatuses may be specially constructed for the desired purposes, or they may include a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROM), random access memories (RAM), electrically programmable read-only memories (EPROM), electrically erasable and programmable read only memories (EEPROM), magnetic or optical cards, or any other type of media suitable for storing electronic instructions, and capable of being coupled to a computer system bus.

The processes presented herein are not inherently related to any particular computer or other processing apparatus. Various general-purpose computing systems may be used with programs in accordance with the teachings herein, or it may prove convenient to construct a more specialized processing apparatus to perform the desired method. The desired structure for a variety of these systems will appear from the description below. In addition, embodiments of the invention are not described with reference to any particular programming and/or query language. It will be appreciated that a variety of programming and/or query languages may be used to implement the teachings of the invention as described herein.

In the following description, various figures, diagrams, flowcharts, models, and descriptions are presented as different means to effectively convey the substances and illustrate different embodiments of the invention that are proposed in this application. It shall be understood by those skilled in the art that they are provided merely as illustrative samples, and shall not be construed as limiting the invention.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for processing a data stream using a map-reduce process, the method comprising:
   executing, until the occurrence of a cut condition defining a partition of the data stream into portions including a first portion, a map function from a set of query processing steps, the map function mapping data into groups to be processed in parallel to generate map results for each group of data in the first portion of the data stream;
   executing a reduce function from the set of query processing steps, the reduce function to aggregate the map results to generate history-sensitive data for the first portion; and
   rewinding the set of query processing steps, without a termination of processing for a second execution of the map function and reduce function on a second portion of the data stream.

2. The method of claim 1, wherein a structured query language (SQL) query provides an expression of the map-reduce process.

3. The method of claim 2, wherein the SQL query includes an expression for a stream source function with a cut condition.

4. The method of claim 2, wherein the SQL query comprises an expression for a user-defined buffer function referencing a storage element for storing data.

5. The method of claim 1, wherein the history-sensitive data is stored in a storage element.

6. The method of claim 5, wherein the storage element is maintained as part of an application context of a processor of a query engine.

7. The method of claim 1, wherein the cut condition is signaled by a stream source function.

8. The method of claim 1, wherein the occurrence of the cut condition is determined by an item of data within the data stream.

9. The method of claim 1, where the occurrence of the cut condition is determined based on a time condition.

10. The method of claim 1, wherein the occurrence of the cut condition is based on data cardinality.

11. A system for processing a data stream comprising:
    a first plurality of processing nodes for receiving a portion of the data stream, for processing a first part of said received portion using a cut condition to signal a halt in processing, and for forwarding processing results after halts in processing have been signaled at all of the first plurality of nodes; and
    a second plurality of processing nodes for receiving the forwarded processing results,
    wherein at least one of the second plurality of processing nodes generates an output, and processing is rewound at the first and second pluralities of nodes, without terminating processing, to maintain the output for processing a next part.

12. The system of claim 11, wherein each processing node of the first plurality of processing nodes processes the received data stream portion part-by-part in a plurality of parts.

13. The method of claim 11, wherein the first plurality of processing nodes execute a map function as part of a map-reduce process.

14. The method of claim 11, wherein the second plurality of nodes execute a reduce function as part of a mop-reduce process to process the forwarded processing results.

15. The method of claim 11, wherein the halts in processing are signaled by stream source function operators at the first plurality of nodes.

16. The method of claim 11, wherein an operator for a user-defined buffer function is used to maintain the output.

17. The method of claim 11, wherein the output comprises history-sensitive data.

18. The method of claim 11, wherein the portions of the data stream are formed by partitioning.

19. A non-transitory machine-readable medium having stored thereon instructions that if executed by a machine, result in:
    executing, until the occurrence of a cut condition defining a partition of the data stream into portions including a first portion, a map function from a set of query processing steps, the map function mapping data into groups to be processed in parallel to generate map results for each group of data in the first portion of the data stream;
    executing a reduce function from the set of query processing steps, the reduce function to aggregate the map results to generate history-sensitive data for the first portion; and
    rewinding the set of query processing steps, without a termination of processing, for a second execution of the map function and reduce function on a second portion of the data stream using the history-sensitive data.

20. The machine-readable medium of claim 19, wherein said reduce function generates an additional result from the map results that is committed to a database before the second execution of the map function and reduce function.

21. A method for processing a data stream comprising:
    extending a query engine to include a rewind function for continuously cycling through a set of set of query processing steps without terminating the cycle;
    associating, with a query compiler, program code for a stream source function;
    associating, with a query compiler, program code for a user-defined buffer function;
    receiving a query containing expressions for the program codes for the stream source function and the user-defined buffer function;
    processing the expressions to create a set of executable query processing steps comprising an executable stream source function and an executable user-defined buffer function; and
    executing the executable query processing steps to process a data stream.

22. The method of claim 21, wherein the executable stream source function signals a cut condition in a first processing cycle, and the rewind function maintains a storage element of the executable user-defined buffer function while rewinding the query processing steps for a second processing cycle.

23. A method for processing a data stream comprising:

distributing, to a first node of a first plurality of nodes, an executable map function operator for mapping a data stream portion into groups to be processed in parallel and an executable stream source function operator;

distributing, to a second node of a second plurality of nodes, an executable reduce function operator for aggregating the map results of groups in the data stream portion, capable of accessing a storage element; and processing a data stream according to a cycle, wherein:

the first node forwards results from an execution of the map function operator to the second node after the stream source operator at the first node signals an occurrence of a cut condition defining a partition of the data stream into a portion, the executable reduce function operator updates the storage element, and the processing of the first and second pluralities of nodes is rewound while maintaining the updated storage element.

24. The method of claim 23, wherein the first and second pluralities of nodes are nodes within a parallel processing computer system.

25. The method of claim 23, where at least one of the map function operator, stream source function operator or reduce function operator is distributed in a sub-query.

* * * * *

UNITED STATES PATENT AND TRADEMARK OFFICE
CERTIFICATE OF CORRECTION

PATENT NO.       : 8,260,803 B2
APPLICATION NO.  : 12/907948
DATED            : September 4, 2012
INVENTOR(S)      : Meichun Hsu et al.

It is certified that error appears in the above-identified patent and that said Letters Patent is hereby corrected as shown below:

In column 32, line 13, in Claim 14, delete "mop-reduce" and insert -- map-reduce --, therefor.

In column 32, line 25, in Claim 19, delete "that" and insert -- that, --, therefor.

In column 32, line 39, in Claim 19, delete "processing," and insert -- processing --, therefor.

In column 32, line 48, in Claim 21, after "set of" delete "set of".

Signed and Sealed this
Twelfth Day of February, 2013

Teresa Stanek Rea
*Acting Director of the United States Patent and Trademark Office*